US010371811B2

(12) United States Patent
Shokonji

(10) Patent No.: US 10,371,811 B2
(45) Date of Patent: Aug. 6, 2019

(54) FOLLOWING-START CONTROL APPARATUS

(71) Applicant: SUBARU CORPORATION, Tokyo (JP)

(72) Inventor: Takafumi Shokonji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 226 days.

(21) Appl. No.: 15/595,086

(22) Filed: May 15, 2017

(65) Prior Publication Data

US 2018/0038952 A1    Feb. 8, 2018

(30) Foreign Application Priority Data

Aug. 5, 2016 (JP) ................. 2016-154501

(51) Int. Cl.
  *G01S 13/86* (2006.01)
  *G08G 1/0962* (2006.01)
  *G08G 1/16* (2006.01)
  *G06K 9/00* (2006.01)
  *G05D 1/00* (2006.01)
  (Continued)

(52) U.S. Cl.
  CPC ........... *G01S 13/867* (2013.01); *B60W 30/08* (2013.01); *B60W 40/076* (2013.01); *G01S 13/931* (2013.01); *G01S 15/025* (2013.01); *G01S 15/931* (2013.01); *G01S 17/023* (2013.01); *G01S 17/936* (2013.01); *G06K 9/00805* (2013.01); *G01S 2007/4082* (2013.01); *G01S 2013/9325* (2013.01);
  (Continued)

(58) Field of Classification Search
  CPC ........ G01S 13/86; G08G 1/16; G08G 1/0962; G05D 1/00; B60W 30/08; G06K 9/00; B60K 41/20
  See application file for complete search history.

(56) References Cited

U.S. PATENT DOCUMENTS

| 6,346,064 B1 * | 2/2002 | Hada ...................... B60K 6/543 |
| | | 477/171 |
| 2004/0085197 A1 * | 5/2004 | Watanabe ................. B60T 7/22 |
| | | 340/435 |

(Continued)

FOREIGN PATENT DOCUMENTS

JP        2015-214309 A    12/2015

*Primary Examiner* — Yuri Kan
(74) *Attorney, Agent, or Firm* — McDermott Will & Emery LLP

(57) ABSTRACT

A following-start control apparatus includes a following-start controller that causes an own vehicle to so start as to follow a preceding vehicle, when start of the preceding vehicle is detected by a preceding vehicle start detector. The following-start controller includes a road surface gradient information setter that sets an estimated gradient of a road surface, on a basis of traveling environment information obtained by a traveling environment information obtaining unit, a first delay time setter that sets, on a basis of the estimated gradient, a first delay time that is set to be longer for a downward slope and set to be shorter for an upward slope as the estimated gradient becomes greater, and a delayed start controller that sets, as a delay time, a time upon so starting the own vehicle as to follow the preceding vehicle, on a basis of the first delay time.

16 Claims, 14 Drawing Sheets

(51) Int. Cl.
    *B60W 30/08*     (2012.01)
    *B60W 40/076*     (2012.01)
    *G01S 15/93*     (2006.01)
    *G01S 17/02*     (2006.01)
    *G01S 17/93*     (2006.01)
    *G01S 15/02*     (2006.01)
    *G01S 13/93*     (2006.01)
    *G06T 7/70*     (2017.01)
    *G01S 7/40*     (2006.01)

(52) U.S. Cl.
    CPC ............... *G01S 2013/9357* (2013.01); *G01S 2013/9364* (2013.01); *G01S 2013/9367* (2013.01); *G06T 7/70* (2017.01)

(56) References Cited

U.S. PATENT DOCUMENTS

| | | | |
|---|---|---|---|
| 2009/0147996 A1* | 6/2009 | Peng | G01C 3/32 |
| | | | 382/106 |
| 2009/0265071 A1* | 10/2009 | Isaji | B60W 30/16 |
| | | | 701/70 |
| 2013/0041567 A1* | 2/2013 | Yamashiro | B60T 7/22 |
| | | | 701/96 |
| 2014/0222280 A1* | 8/2014 | Salomonsson | G08G 1/167 |
| | | | 701/28 |
| 2015/0206430 A1* | 7/2015 | Yang | G08G 1/166 |
| | | | 340/435 |
| 2017/0206788 A1* | 7/2017 | Hu | G08G 1/09623 |

* cited by examiner

FOLLOWING-START CONTROL APPARATUS

CROSS-REFERENCE TO RELATED APPLICATIONS

The present application claims priority from Japanese Patent Application No. 2016-154501 filed on Aug. 5, 2016, the entire contents of which are hereby incorporated by reference.

BACKGROUND

The technology relates to a following-start control apparatus that so automatically starts an own vehicle as to follow the start of a preceding vehicle.

An adaptive cruise control (ACC) system has been known that performs a constant-speed travel control and a following-travel control. The ACC system performs the constant-speed travel control that causes an own vehicle to keep a set vehicle speed when a preceding vehicle is absent, and performs, when the preceding vehicle is detected, the following-travel control that causes the own vehicle to follow the preceding vehicle while keeping an inter-vehicular distance directed to the following travel between the own vehicle and the preceding vehicle.

A recent ACC system extends a range in which the ACC system is applied to a low speed range, such as a range that covers zero km/h, to allow for a function of following the preceding vehicle during a traffic jam. Such an ACC system so stops the own vehicle automatically as to follow the stop of the preceding vehicle set as a target to follow when detecting the stop of the preceding vehicle, and so starts the own vehicle automatically as to follow the start of the preceding vehicle when detecting the start of the preceding vehicle thereafter.

In a situation in which the preceding vehicle stops and starts repeatedly, such as during a traffic jam, an inter-vehicular distance between the own vehicle and the preceding vehicle may sometimes become short due to a sudden stop of the preceding vehicle, a delay in perception of a driver, or any other factor. This concern occurs when a response time required for the own vehicle to start automatically is set to a response time which is about the same as that used upon a normal following-travel operation. In contrast, setting the response time longer raises a concern that the inter-vehicular distance between the own vehicle and the preceding vehicle becomes longer, thus impairing the performance of following the preceding vehicle.

To address these concerns, Japanese Unexamined Patent Application Publication (JP-A) No. 2015-214309 discloses a technique in which a timing of starting an own vehicle after detecting the start of a preceding vehicle is set on the basis of an inter-vehicular distance and a relative speed both between the own vehicle and the preceding vehicle. The technique disclosed in JP-A No. 2015-214309 sets, with use of a map in which an inter-vehicular distance and a relative speed are set in advance, the timing of starting the own vehicle on the basis of the inter-vehicular distance and the relative speed that are both after the start of the stopped preceding vehicle where a speed of the own vehicle is zero km/h, and starts the own vehicle at the thus-set timing.

SUMMARY

When causing an own vehicle to so start as to follow a preceding vehicle, it is desirable that favorable driving performance be achieved without giving a driver a sense of discomfort.

It is desirable to provide a following-start control apparatus that is able to reduce a possibility of giving a driver a sense of discomfort and thereby achieve favorable driving performance when causing an own vehicle to so start as to follow a preceding vehicle.

An aspect of the technology provides a following-start control apparatus that includes: a traveling environment information obtaining unit that obtains, as traveling environment information, information on a traveling environment around an own vehicle; a preceding vehicle information obtaining unit that obtains, as preceding vehicle information, information on a preceding vehicle that travels ahead of the own vehicle, on a basis of the traveling environment information obtained by the traveling environment information obtaining unit; a preceding vehicle start detector that determines, on a basis of the preceding vehicle information obtained by the preceding vehicle information obtaining unit, an inter-vehicular distance between the preceding vehicle and the own vehicle that is stopped, and detects start of the preceding vehicle on a basis of a change in the inter-vehicular distance; and a following-start controller that causes the own vehicle to so start as to follow the preceding vehicle, when the start of the preceding vehicle is detected by the preceding vehicle start detector. The following-start controller includes: a road surface gradient information setter that sets an estimated gradient of a road surface on which the own vehicle is stopped, on a basis of the traveling environment information obtained by the traveling environment information obtaining unit; a first delay time setter that sets a first delay time on a basis of the estimated gradient set by the road surface gradient information setter, in which the first delay time is set to be longer as the estimated gradient becomes greater when the own vehicle is on a downward slope, and is set to be shorter as the estimated gradient becomes greater when the own vehicle is on an upward slope; and a delayed start controller that sets, as a delay time, a time upon so starting the own vehicle as to follow the preceding vehicle, on a basis of the first delay time set by the first delay time setter.

An aspect of the technology provides a following-start control apparatus that includes: a camera that captures an image of a traveling environment around an own vehicle to obtain image information; and circuitry that obtains, as traveling environment information, information on the traveling environment around the own vehicle, on a basis of the image information obtained by the camera, obtains, as preceding vehicle information, information on a preceding vehicle that travels ahead of the own vehicle, on a basis of the traveling environment information, and determines, on a basis of the preceding vehicle information, an inter-vehicular distance between the preceding vehicle and the own vehicle that is stopped, to detect start of the preceding vehicle on a basis of a change in the inter-vehicular distance. When the start of the preceding vehicle is detected, the circuitry sets an estimated gradient of a road surface on which the own vehicle is stopped, on a basis of the traveling environment information, sets a first delay time on a basis of the estimated gradient, in which the first delay time is set to be longer as the estimated gradient becomes greater when the own vehicle is on a downward slope, and is set to be shorter as the estimated gradient becomes greater when the own vehicle is on an upward slope, sets, as a delay time, a time upon so starting the own vehicle as to follow the preceding vehicle, on a basis of the first delay time, and causes the own vehicle to so start as to follow the preceding vehicle, on a basis of the delay time.

DETAILED DESCRIPTION

In the following, a description is given of one implementation of the technology with reference to the accompanying drawings.

Figure 1:
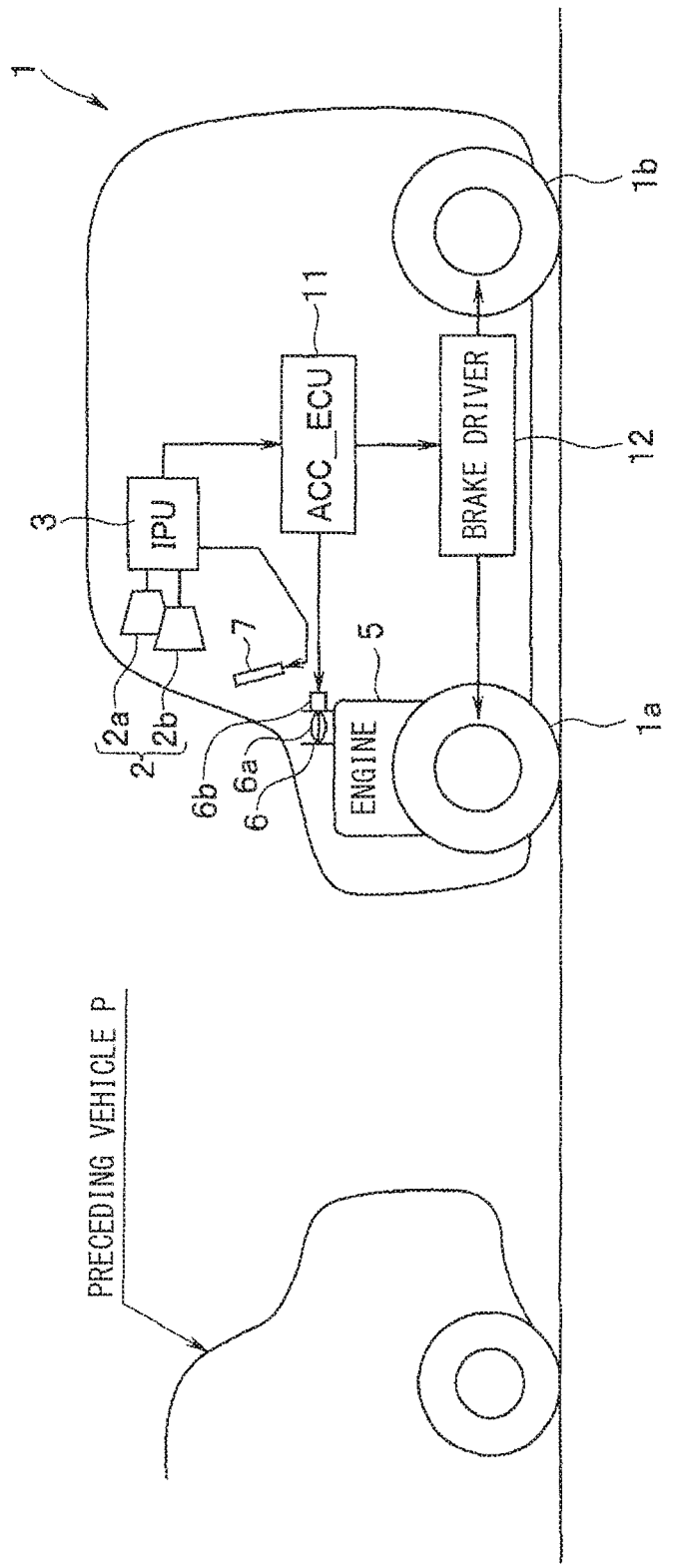
FIG. 1 schematically illustrates a vehicle on which a following-start control apparatus according to an implementation of the technology is mounted.

Referring to FIG. 1, a vehicle or an "own vehicle" 1 may have right and left front wheels 1a and right and left rear wheels 1b. The own vehicle 1 may be a four-wheel-drive vehicle in an illustrated example. The own vehicle 1 is provided with an on-vehicle camera 2 that captures an image of a traveling environment around the own vehicle 1. The on-vehicle camera 2 according to the present implementation may be a stereo camera that includes a camera 2a and a camera 2b. The camera 2a and the camera 2b may be so fixed at a front-upper region in a vehicle interior as to keep a certain distance therebetween. For example, the camera 2a and the camera 2b may be provided on both sides of a rear-view mirror. The on-vehicle camera 2 may transmit, to an image processing unit (IPU) 3, an image signal (or image information) related to images of the traveling environment ahead of the own vehicle 1 which are captured by the camera 2a and the camera 2b.

The IPU 3 obtains information on the traveling environment around and ahead of the own vehicle 1, on the basis of the image information obtained by the on-vehicle camera 2. On the basis of the thus-obtained traveling environment information, the IPU 3 obtains information on a preceding vehicle P that travels ahead of the own vehicle (hereinafter may be referred to as "preceding vehicle information"), and may obtain obstacle detection information. The obstacle detection information may relate to a moving obstacle close to the own vehicle 1 such as a pedestrian, a bicycle, and a motorcycle, and may relate to a fixed obstacle close to the own vehicle 1 such as a guardrail and a tree. The IPU 3 may transmit, to various controllers that control the own vehicle 1, various pieces of information including the traveling environment information, the preceding vehicle information obtained on the basis of the traveling environment information, and the obstacle detection information obtained on the basis of the traveling environment information. In one implementation, the on-vehicle camera 2 and the IPU 3 may serve as a "traveling environment information obtaining unit". In one implementation, the IPU 3 may serve as a "preceding vehicle information obtaining unit" that obtains the preceding vehicle information, and may serve as an "obstacle detection information obtaining unit".

The own vehicle 1 may be mounted with an engine 5 and an electronic control throttle 6 provided in an inlet system of the engine 5. The electronic control throttle 6 may have a throttle valve 6a that is opened and closed freely by a throttle actuator 6b. The own vehicle 1 may also have an idling stop system (ISS), allowing the engine 5 to be stopped when a speed of the own vehicle 1 is equal to or less than a stop determination vehicle speed, such as any speed in a range from 10 km/h to 15 km/h.

Further, the own vehicle 1 includes an ACC control unit (ACC_ECU) 11. In one implementation, the ACC_ECU 11 may serve as a "following-start controller". The ACC_ECU 11 may be mainly configured by a known microcomputer that includes devices such as a central processing unit (CPU), a read only memory (ROM), and a random access memory (RAM). The ROM may contain control programs that achieve predetermined operations and fixed data such as various tables.

Figure 2:
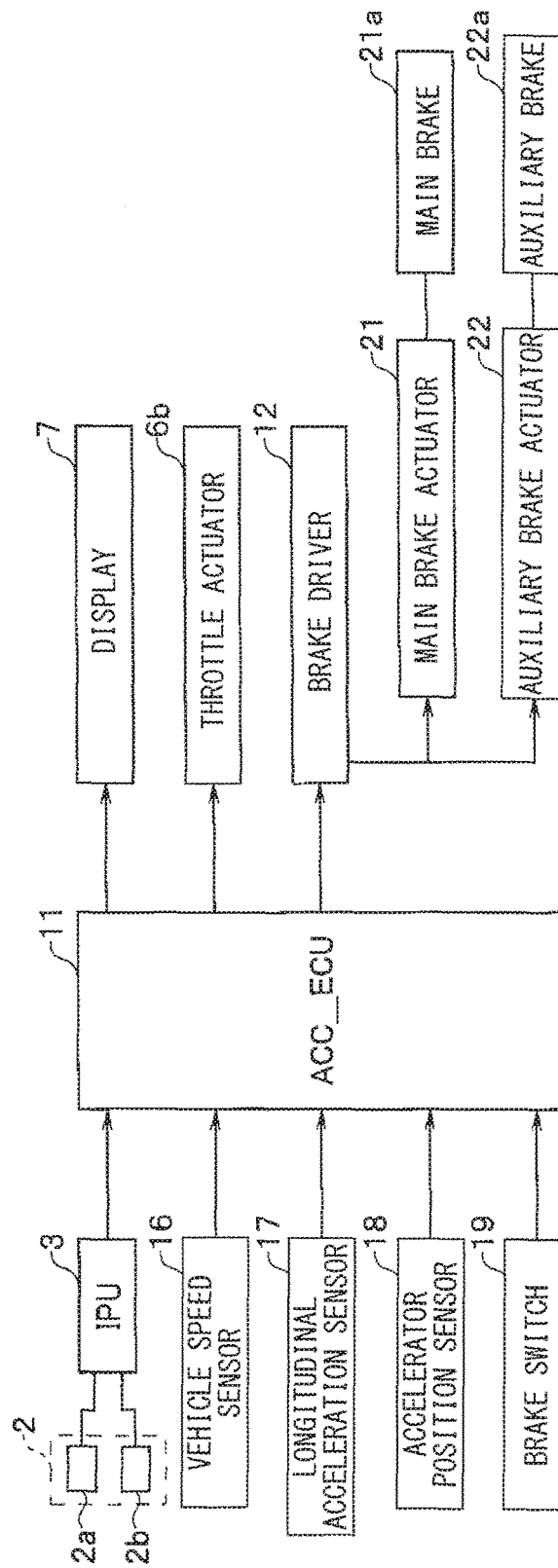
FIG. 2 illustrates an example of a configuration of the following-start control apparatus.

FIG. 2 illustrates an example of a configuration of the following-start control apparatus according to the present implementation. The ACC_ECU 11 may be coupled to various sensors and switches that detect an environment around the own vehicle 1 and a driving state of the own vehicle 1. Non-limiting examples of the various sensors and switches may include a vehicle speed sensor 16, a longitudinal acceleration sensor 17, an accelerator position sensor 18, and a brake switch 19. The vehicle speed sensor 16 may detect a vehicle speed of the own vehicle 1 or an "own vehicle speed". In one implementation, the vehicle speed sensor 16 may serve as a "vehicle speed detector". The longitudinal acceleration sensor 17, or a "longitudinal accelerometer", may detect an acceleration rate in a front-rear direction of the own vehicle 1. The accelerator position sensor 18 may detect a position of an accelerator on the basis of a pressing amount of an accelerator pedal. The brake switch 19 may detect pressing down of a brake pedal and thereby output an "ON" signal. These sensors and switches may be coupled to an input of the ACC_ECU 11.

The ACC_ECU 11 may also be coupled to a display 7, the throttle actuator 6b, and a brake driver 12. The brake driver 12 may be coupled to a main brake actuator 21 and an auxiliary brake actuator 22. The display 7 may be a multi-information display (MID) provided at a combination meter located in front of a driver's seat, a monitor provided for a car navigation system, or any display provided in the vehicle interior. The display 7, the throttle actuator 6b, and the brake driver 12 may be coupled to an output of the ACC_ECU 11.

The main brake actuator 21 may increase and decrease a brake fluid pressure supplied from a hydraulic control unit (HCU) provided in the brake driver 12 to adjust braking force applied to a main brake 21a. The main brake 21a may be provided for each of the right and left front wheels 1a, and may be any brake such as a disc brake. The auxiliary brake actuator 22 may cause an auxiliary brake 22a provided for each of the right and left rear wheels 1b to operate upon the stop of the own vehicle 1 to keep a state in which the own vehicle 1 is stopped. The auxiliary brake 22a may be any brake such as a drum brake. The main brake 21a may be so configured that desired braking force is achieved also by a foot braking operation performed by a driver.

The ACC_ECU 11 may output drive signals to the throttle actuator 6b of the electronic control throttle 6 and to the brake driver 12, on the basis of signals obtained by the various sensors and switches. The ACC_ECU 11 may also determine whether the preceding vehicle P ahead of the own vehicle 1 is captured, on the basis of the traveling environment information obtained by the IPU 3. The ACC_ECU 11 may execute a constant-speed travel control when the preceding vehicle P is determined as not being captured. The constant-speed travel control, or a "constant-speed cruise control", may cause the own vehicle 1 to travel at a set vehicle speed. When the preceding vehicle P is determined as being captured, the ACC_ECU 11 may calculate an inter-vehicular distance and a relative speed both between the preceding vehicle P and the own vehicle 1, on the basis of the preceding vehicle information obtained by the IPU 3 and the speed of the own vehicle 1 detected by the vehicle speed sensor 16. By calculating the inter-vehicular distance and the relative speed, the ACC_ECU 11 may perform a following-travel control, or a "following cruise control".

Further, the ACC_ECU 11 may be so configured that a range in which an adaptive cruise control (ACC) is applied is extended to a low speed range, such as a range that covers zero km/h. With this configuration, the ACC_ECU 11 may so stop the own vehicle 1 automatically as to follow the stop of the preceding vehicle P set as a target to follow when the stop of the preceding vehicle P is detected, and may so start the own vehicle 1 automatically as to follow the start of the preceding vehicle P when the start of the preceding vehicle P is detected thereafter.

Figure 3:
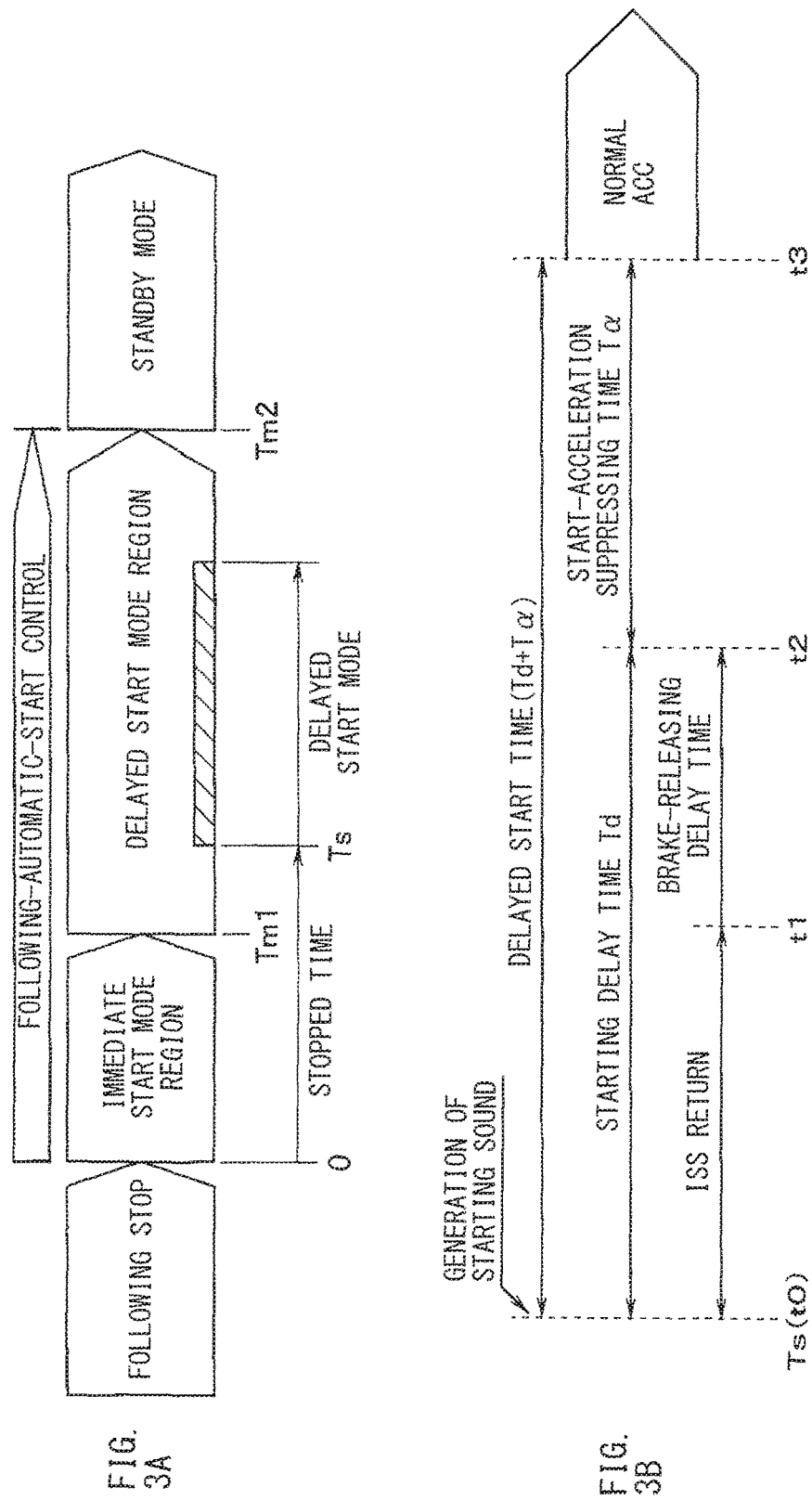
FIG. 3A describes an example of a start mode upon performing a following-automatic-start control.
FIG. 3B is a time chart illustrating an example of a starting delay control upon a delayed start mode.

Referring to FIG. 3A, the ACC_ECU 11 may stop the own vehicle 1 while keeping a predetermined inter-vehicular distance between the own vehicle 1 and the preceding vehicle P when the stop of the preceding vehicle P is detected, and may perform a standby operation until the preceding vehicle P starts. In other words, the ACC_ECU 11 may perform a following stop. When the start of the preceding vehicle P is detected, the ACC_ECU 11 may so start the own vehicle 1 automatically as to follow the start of the preceding vehicle P, may perform a following-automatic-start control. For the following-automatic-start control, the ACC_ECU 11 may select one of an immediate start mode and a delayed start mode, depending on a time period Ts that ranges from a time point at which the own vehicle 1 is so stopped as to follow the preceding vehicle P to a time point at which a start command signal is transmitted after the start of the preceding vehicle P is detected. Hereinafter, the time period Ts is referred to as a "stopped time" Ts. The stopped time Ts may be measured by a timer provided in the ACC_ECU 11. In one implementation, the ACC_ECU 11 may serve as a "stopped time measurer".

The immediate start mode may be applied when the stopped time Ts is less than a relatively-short immediate-start permitting time Tm1 set in advance. For example, the immediate-start permitting time Tm1 may be any value ranging from 1 second to 3 seconds in the present implementation. The delayed start mode may be applied when the stopped time Ts is equal to or greater than the immediate-start permitting time Tm1 and less than an automatic-start permitting time Tm2. The automatic-start permitting time Tm2 may be a maximum time during which execution of the following-automatic start is permitted, and may range from about 10 seconds to about 120 seconds in the present implementation. The following-automatic-start control may be deactivated when the stopped time Ts is equal to or greater than the automatic-start permitting time Tm2. In this case, a mode may be set to a standby mode in which a control is performed on the basis of a normal ACC. The standby mode may be continued until an operation that reflects a driver's intention of starting the own vehicle 1 is detected. Non-limiting examples of such an operation may include pressing down on the accelerator pedal and turning on an ACC switch.

When so starting the n vehicle 1 as to follow the preceding vehicle P automatically, the immediate start mode may restart the engine 5 immediately by means of the idling stop system (ISS) and may thereafter release the state in which the own vehicle 1 is kept stopped by the main brake 21a to thereby start the own vehicle 1, without generating a sound notifying the start of the own vehicle 1. In contrast, as illustrated in FIG. 3B, the delayed start mode may first generate the starting sound and restart the engine 5 by means of the ISS to prepare for the start of the own vehicle 1, when so starting the own vehicle 1 as to follow the preceding vehicle P. After preparing for the start of the own vehicle 1, the delayed start mode may control the releasing of the state in which the own vehicle 1 is kept stopped by the main brake 21a and may control a position of the throttle valve 6a to start the own vehicle 1 after a predetermined brake release time is elapsed. Thereafter, a control of suppressing acceleration of the own vehicle 1 may be performed for a predetermined time, following which the following-automatic-start control may be deactivated to make a transition from the following-automatic-start control to the control based on the normal ACC.

Figure 7:
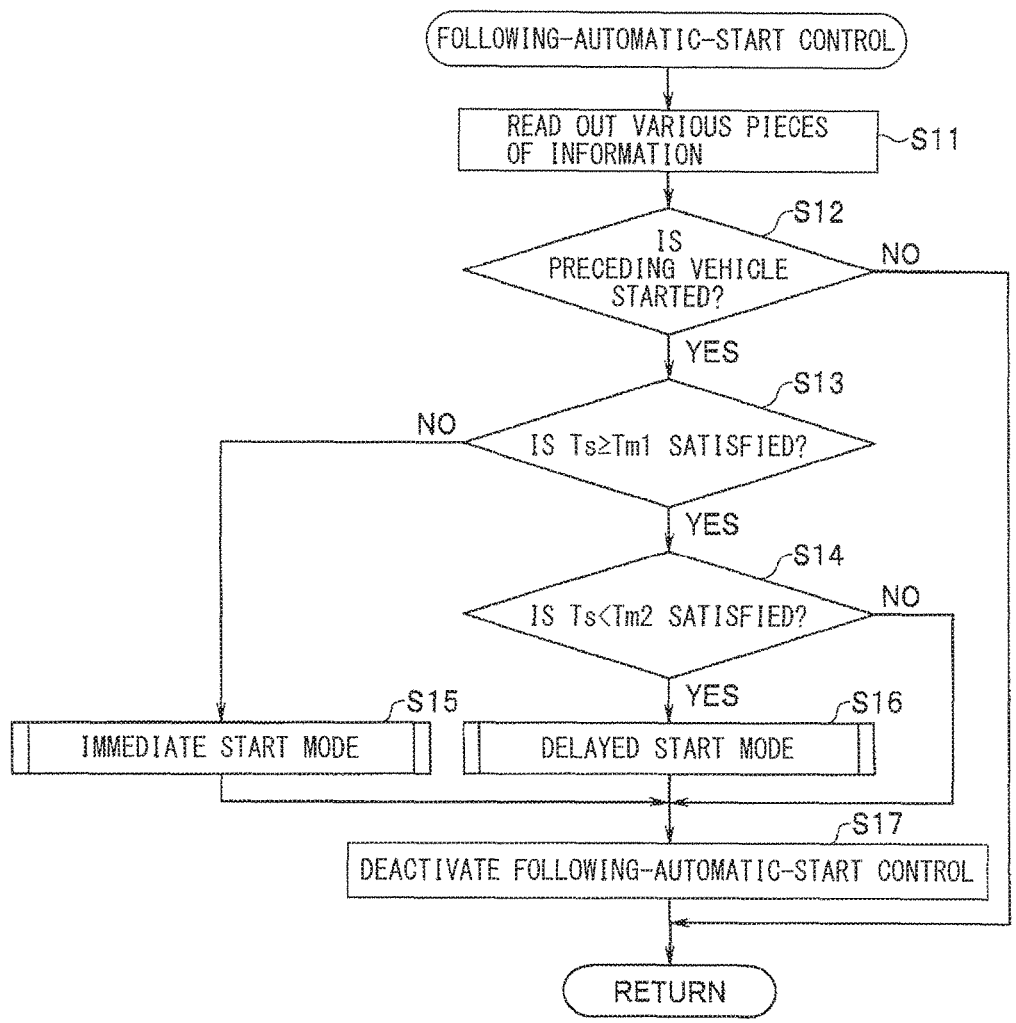
FIG. 7 is a flowchart illustrating an example of a routine of the following-automatic-start control.

The ACC_ECU 11 may perform the following-automatic-start control in accordance with a routine of the following-automatic-start control illustrated by way of example in FIG. 7.

Figure 6:
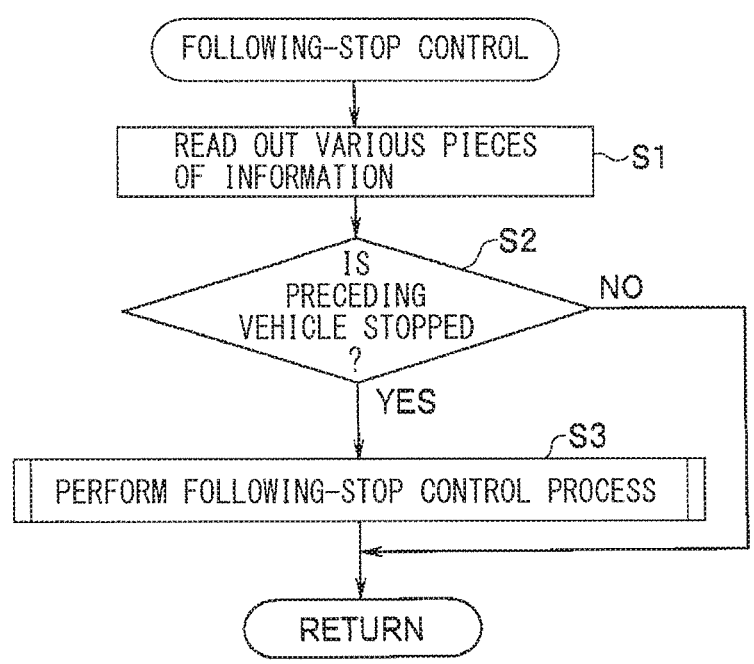
FIG. 6 is a flowchart illustrating an example of a routine of a following-stop control.

Before describing the following-automatic-start control routine, a concise description is given, by referring to a following-stop control routine illustrated in FIG. 6, of a following-stop control performed before the execution of the following-automatic start.

While the own vehicle 1 so travels as to follow the preceding vehicle P after detecting the preceding vehicle P, the following-stop control routine may involve reading out of the various pieces of information in step S1. The various pieces of information to be read out in step S1 may include the traveling environment information detected by the IPU 3. In step S2, the relative speed between the preceding vehicle P and the own vehicle 1 may be calculated on the basis of the obtained traveling environment information. Further, in step S2, a determination may be made as to whether the preceding vehicle P is stopped on the basis of the relative speed and the speed of the own vehicle 1 detected by the vehicle speed sensor 16. The routine may be terminated when the preceding vehicle P is determined as being not stopped, i.e., when the preceding vehicle P still travels (S2: NO). When the preceding vehicle P is determined as being stopped, i.e., when the stop of the preceding vehicle P is detected (S2: YES), a flow may proceed to step S3 in which a process of performing the following-stop control is executed. The routine may be terminated after the execution of the following-stop control.

In the following-stop control process executed in step S3, a target vehicle speed may be calculated for each calculation cycle, on the basis of a preset target stop inter-vehicular distance and an actual inter-vehicular distance between the own vehicle 1 and the preceding vehicle P, for example. The target vehicle speed, i.e., a deceleration rate, may be a speed by which the own vehicle 1 is so stopped as to follow the preceding vehicle P while keeping the target stop inter-vehicular distance between the own vehicle 1 and the preceding vehicle P. Further, in the following-stop control process executed in step S3, a vehicle speed control may be so performed that the speed of the own vehicle 1 becomes the target vehicle speed by outputting the drive signals to the throttle actuator 6b and the brake driver 12, causing the own vehicle 1 to decelerate gradually and thereby allowing the own vehicle 1 to so stop as to follow the preceding vehicle P.

After the own vehicle 1 has so stopped as to follow the preceding vehicle P, an auxiliary brake operating signal may be outputted to the brake driver 12 to drive the auxiliary brake actuator 22, causing the auxiliary brake 22a to operate and thereby keeping the state in which the own vehicle 1 is stopped.

The following-automatic-start control routine illustrated by way of example in FIG. 7 may be activated when the own vehicle 1 has so stopped as to follow the preceding vehicle P. The following-automatic-start control routine may first involve, in step S11, reading out of various pieces of information outputted from the IPU 3. The various pieces of information may include information directed to detection of a stopped state of the preceding vehicle P. In step S12, a determination may be made as to whether the preceding vehicle P is started. For example, whether the preceding vehicle P is started may be determined on the basis of whether the inter-vehicular distance, calculated from the preceding vehicle information obtained by the IPU 3, is varied to a preset target start inter-vehicular distance. Here, the target start inter-vehicular distance may be greater than the target stop inter-vehicular distance (target stop inter-vehicular distance<target start inter-vehicular distance). In one implementation, the ACC_ECU 11 that performs the process in step S12 may serve as a "preceding vehicle start detector".

The routine may be terminated when the preceding vehicle P is determined as not being started, i.e., when the preceding vehicle P maintains the stopped state (S12: NO). When the preceding vehicle P is determined as being started, i.e., when the start of the preceding vehicle P is detected (S12: YES), a flow may proceed to step S13. In steps S13 and S14, the stopped time Ts that ranges from the time point at which the own vehicle 1 is so stopped as to follow the preceding vehicle P to the time point at which the start command signal is transmitted may be compared with the immediate-start permitting time Tm1 and the automatic-start permitting time Tm2 to determine whether the stopped time Ts falls in the region by which the immediate start mode is to be applied or falls in the region by which the delayed start mode is to be applied.

First, in step S13, the stopped time Ts may be compared with the immediate-start permitting time Tm1 that may be any value ranging from about 1 second to about 3 seconds. When the stopped time Ts is determined as being less than the immediate-start permitting time Tm1, i.e., when "Ts<Tm1" is satisfied (S13: NO), the flow may proceed to step S15 by determining that the stopped time Ts falls in the region by which the immediate start mode is to be applied as illustrated in FIG. 3A. In step S15, a process directed to the immediate start mode may be executed, following which the flow may proceed to step S17. The immediate start mode process may so start the own vehicle 1 as to follow the preceding vehicle P immediately after detecting the start of the preceding vehicle P, without notifying the driver of the start of the own vehicle 1 by voice or any other notifying method, i.e., without generating the sound. The own vehicle 1 thus so starts as to follow the preceding vehicle P immediately while skipping the notification of the start of the own vehicle 1 when the stopped time Ts is less than the immediate-start permitting time Tm1, i.e., when the preceding vehicle P has restarted in a short time after the preceding vehicle P has stopped. This configuration prevents the driver from experiencing late starting or clumsiness and thus allows for a starting control of the own vehicle 1 which meets a driver's intention.

When the stopped time Ts is determined as being equal to or greater than the immediate-start permitting time Tm1, i.e., when "Ts≥Tm1" is satisfied (S13: YES), the flow may proceed to step S14 in which the stopped time Ts may be compared with the automatic-start permitting time Tm2. As already described above, the automatic-start permitting time Tm2 may be the maximum time during which the execution of the following-automatic start is permitted (e.g., may range from about 10 seconds to about 120 seconds), and a transition may be made to the normal ACC mode when the stopped time Ts exceeds the automatic-start permitting time Tm2.

When the stopped time Ts is determined as being less than the automatic-start permitting time Tm2, i.e., when "Ts<Tm2" is satisfied (S14: YES), the flow may proceed to step S16 by determining that the stopped time Ts falls in the region by which the delayed start mode is to be applied as illustrated in FIG. 3A. In step S16, a process directed to the delayed start mode may be executed, following which the flow may proceed to step S17. The flow may jump to step S17 when the stopped time Ts is determined as being equal to or greater than the automatic-start permitting time Tm2, i.e., when "Ts≥Tm2" is satisfied (S14: NO).

Figure 8:
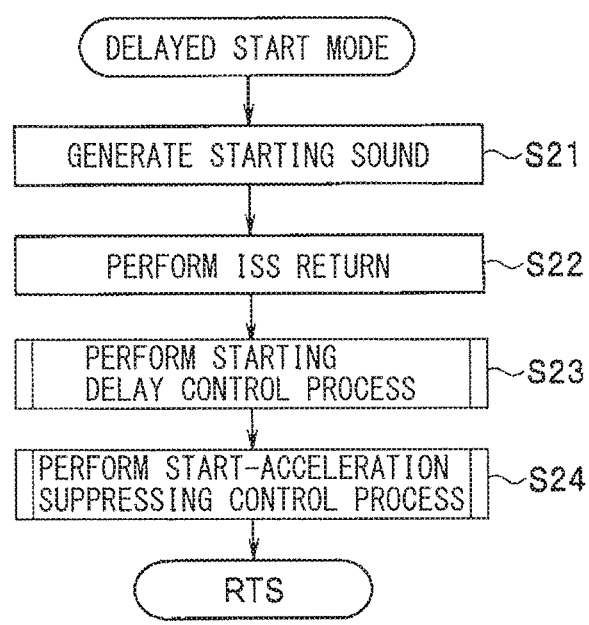
FIG. 8 is a flowchart illustrating an example of a subroutine of processes directed to the delayed start mode.

The delayed start mode process may be performed in step S16 in accordance with a subroutine of the delayed start mode process illustrated by way of example in FIG. 8. A description is now given of processes performed in this subroutine by referring also to the time chart illustrated in FIG. 3B.

The delayed start mode process subroutine may first involve, in step S21, generating the starting sound in order to notify the driver of a fact that the own vehicle 1 performs the following start (an elapsed time t0). The starting sound may be generated by transmitting a drive signal to a notifying device such as a speaker built in the display 7 and a buzzer. A flow may thereafter proceed to step S22 in which the engine 5 may be restarted (a return based on the ISS may be performed) to prepare for the start of the own vehicle 1, following which the flow may proceed to step S23. It is to be noted that a delay time required for the ISS to restart the engine 5, i.e., perform the ISS return (an elapsed time t1), from a stopped state of the engine 5 is substantially constant for each vehicle model. For example, the delay time may range from about 0.5 seconds to 1.0 second.

A process directed to a starting delay control may be executed when the flow proceeds to step S23. The starting delay control process may set a starting delay time Td as a delay time illustrated in FIG. 3B. It is to be noted that the time required to perform the ISS return, i.e., an ISS return time, is substantially constant for each vehicle model, meaning that a brake-releasing delay time ranging from t1 to t2 is set in reality for the starting delay control process. It is to be also noted that the starting delay time Td may be equal to the brake-releasing delay time when the own vehicle 1 is not provided with the ISS.

Figure 9:
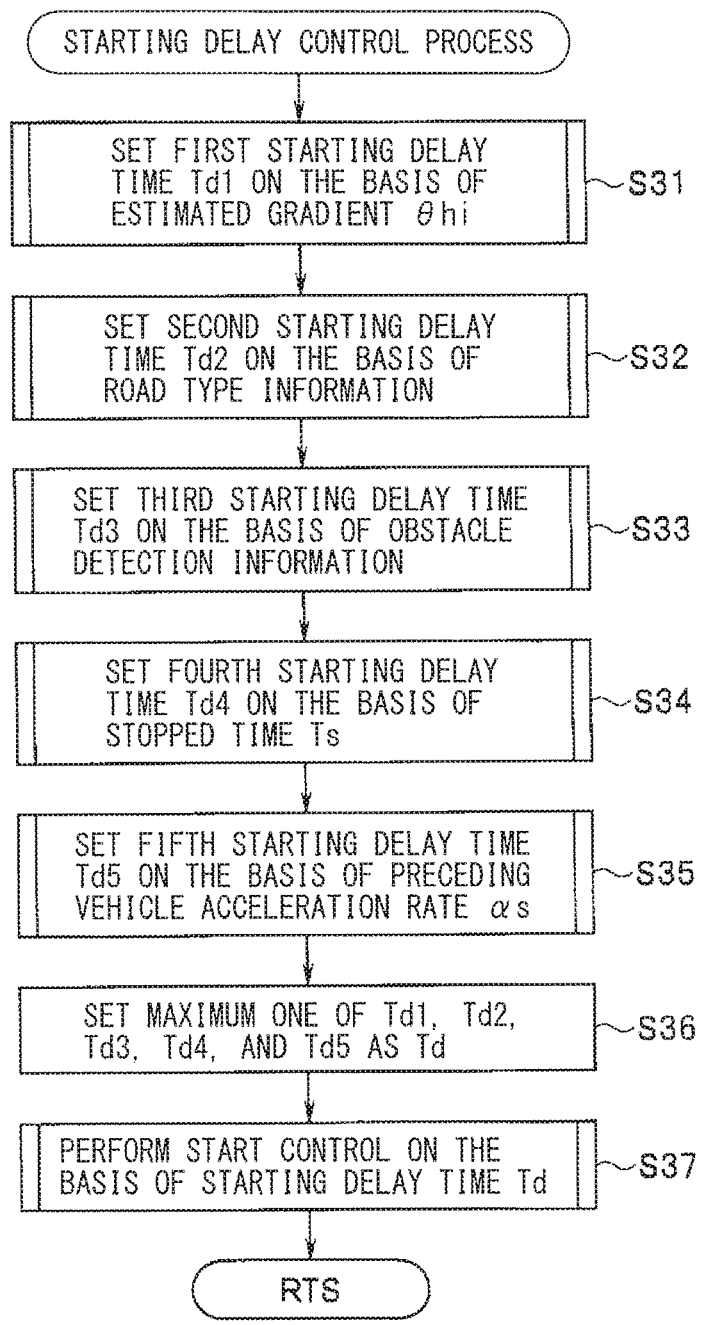
FIG. 9 is a flowchart illustrating an example of a subroutine of processes directed to the starting delay control.

The starting delay control process may be performed in accordance with a subroutine of the starting delay control process illustrated by way of example in FIG. 9. In one implementation, the ACC_ECU 11 that performs the processes from steps S32 to S35 as described below may serve as "at least one delay time setter".

The starting delay control process subroutine may first involve, in step S31, reading out of an estimated gradient θhi of a road surface, to thereby set a first starting delay time Td1 as a first delay time on the basis of the estimated gradient θhi. The estimated gradient θhi may be a gradient of the road surface at the time when the own vehicle 1 is determined as being stopped for a fact that the speed of the own vehicle 1 detected by the vehicle speed sensor 16 is equal to or less than the stop determination vehicle speed. For example, the stop determination vehicle speed may range from 10 km/h to 15 km/h. The estimated gradient θhi may be estimated on the basis of a brake fluid pressure needed to keep the own vehicle 1 stopped. The brake fluid pressure may be supplied to the main brake 21a through the main brake actuator 21 from the brake driver 12. Alternatively, the estimated gradient θhi may be estimated on the basis of a history of the traveling road surface ahead of the own vehicle 1. The history may be obtained on the basis of the imaging performed by the on-vehicle camera 2, and may cover a time point at which the own vehicle 1 is stopped. Yet alternatively, the estimated gradient θhi may be set on the basis of a detection value obtained by the longitudinal acceleration sensor 17 at the time of the stop of the own vehicle 1. In one implementation, a sensor that detects the brake fluid pressure, a storage that stores the history of the traveling road surface ahead of the own vehicle 1 obtained on the basis of the imaging performed by the on-vehicle camera 2, the longitudinal acceleration sensor 17, and the ACC_ECU 11 that performs the process in step S31 each may serve as a "road surface gradient information setter".

The first starting delay time Td1 may be so set as to allow the own vehicle 1 to start a timing substantially the same as a timing at which the own vehicle 1 starts on a flat location without being influenced by the road surface gradient upon the start. The first starting delay time Td1 according to the present implementation may be set on the basis of the estimated gradient θhi and by referring to a table directed to the first starting delay time Td1 illustrated in FIG. 11.

Figure 4:
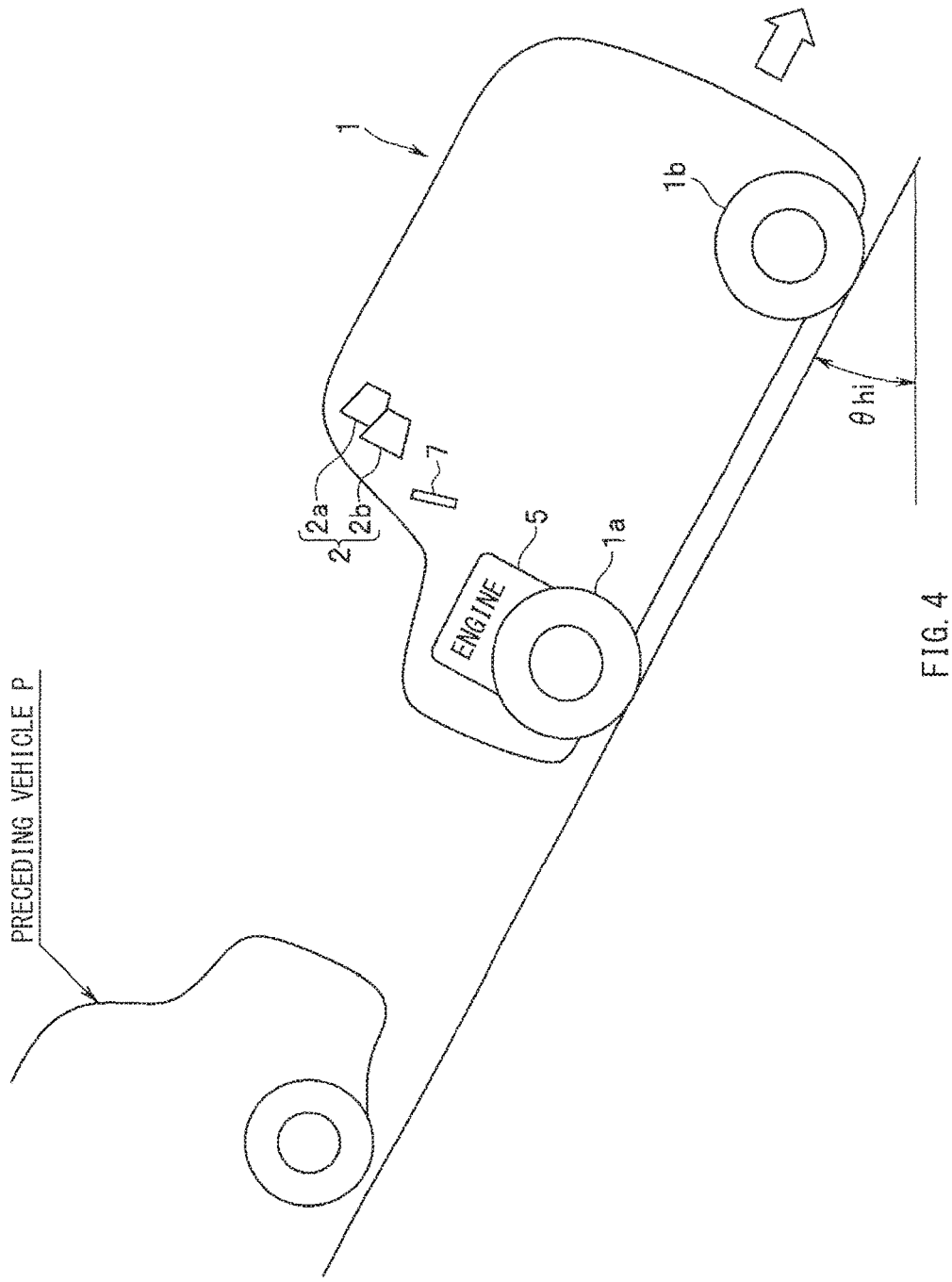
FIG. 4 describes an example of the following-automatic-start control performed from a state where an own vehicle is stopped on an upward slope.
Figure 5:
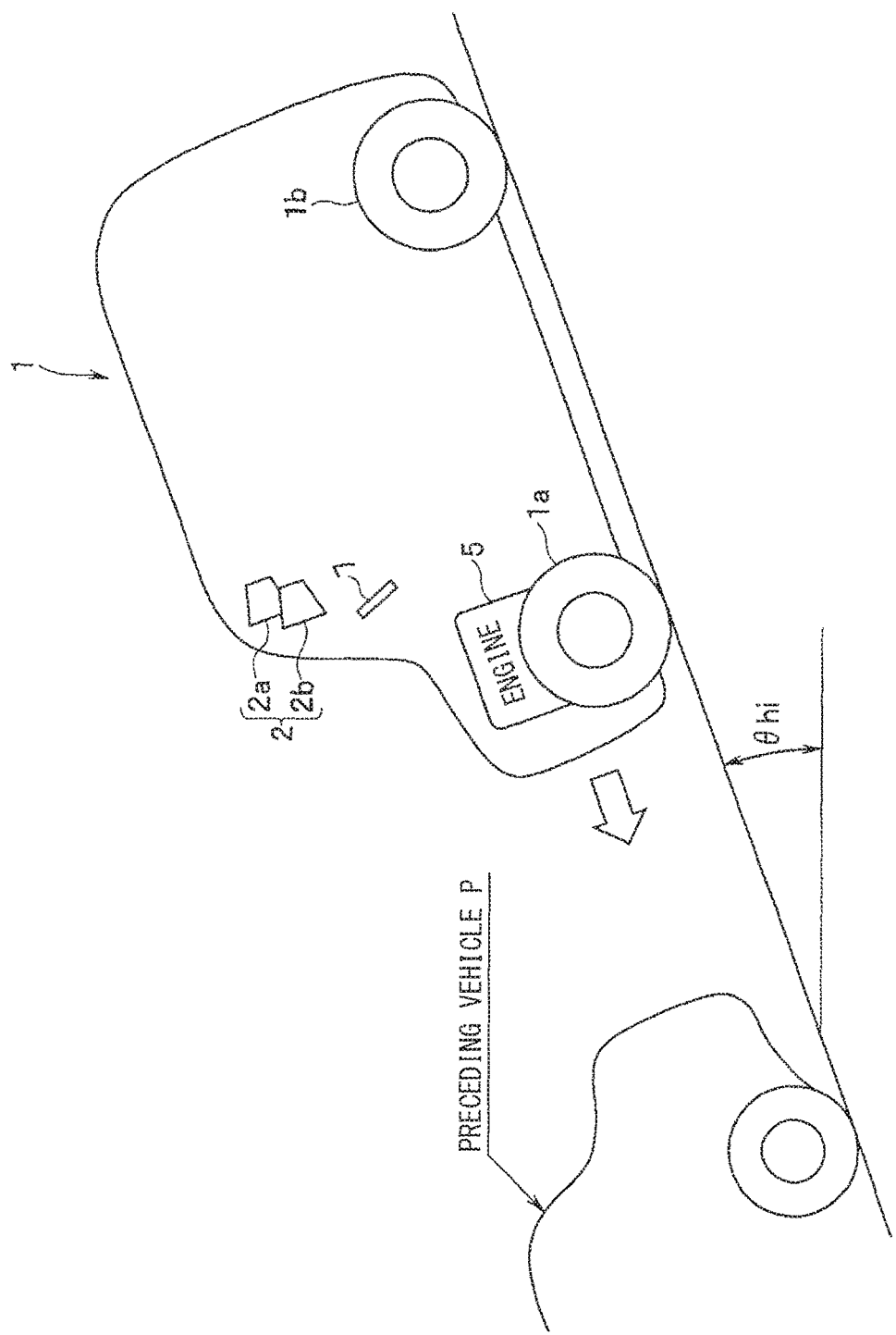
FIG. 5 describes an example of the following-automatic-start control performed from a state where the own vehicle is stopped on a downward slope.

When the own vehicle 1 is stopped on a slope, slip-down force parallel to the road surface acts on the own vehicle 1 constantly due to the own weight as illustrated in FIGS. 4 and 5. Accordingly, when the braking force applied to the main brake 21a is released upon the restart from the slope, the own vehicle 1 moves easily and immediately in a case of the downward slope, whereas the own vehicle 1 starts to move when, excluding any frictional resistance, drive torque that exceeds the slip-down force acts on the right and left front wheels 1a in a case of the upward slope.

Figure 11:
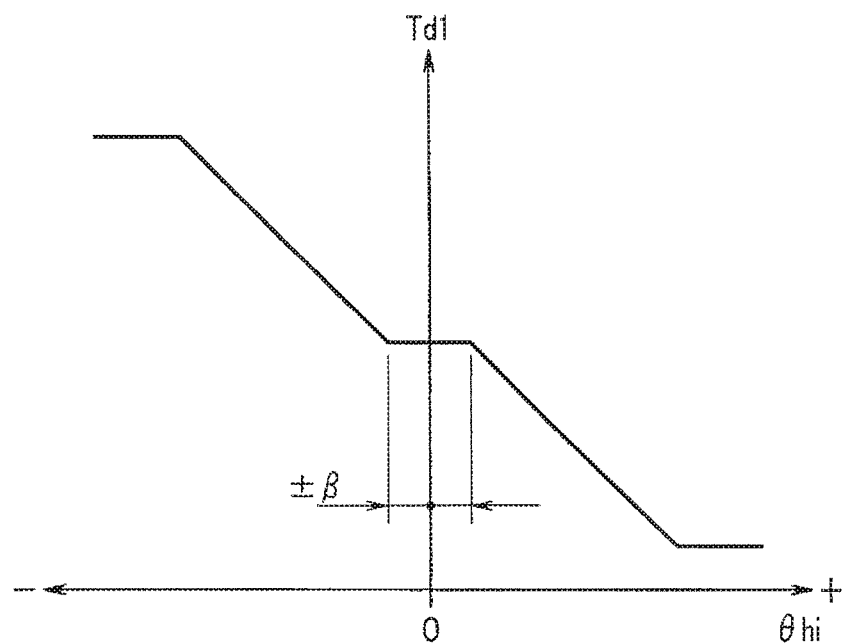
FIG. 11 is a conceptual diagram illustrating an example of a table directed first starting delay time.

The table directed to the first starting delay time Td1 illustrated in FIG. 11 may be so configured that the first starting delay time Td1 is set by which the own vehicle 1 is able to initiate the start in a substantially constant delay time in a state in which the own vehicle 1 is stopped on the slope, without being influenced by the gradient of the slope. For example, in order to allow the starting delay time Td to be substantially constant, the table directed to the first starting delay time Td1 may be so configured that the first starting delay time Td1 is set, on the basis of the estimated gradient θhi, to be longer as the estimated gradient θhi goes more to a minus direction (i.e., as the downward gradient increases a case of the downward slope, and that the first starting delay time Td1 is set, on the basis of the estimated gradient θhi, to be gradually shorter as the estimated gradient θhi becomes greater in a case of the upward slope.

The first starting delay time Td1 is made long in a case where the own vehicle 1 is on the downward slope and made short in a case where the own vehicle 1 is on the upward slope, by taking into consideration the influence of the slip-down force applied when the own vehicle 1 actually starts to move from the downward slope or from the upward slope. With this configuration, it is possible to allow the own vehicle 1 to start on the slope at a substantially constant timing relatively. Hence, it is possible to prevent the driver from experiencing clumsiness that the driver may experience until the own vehicle 1 starts to move in a case of the upward slope, and to prevent the own vehicle 1 from starting to move early, i.e., rushing forward, in a case of the downward slope.

The table directed to the first starting delay time Td1 may have a dead zone. The dead zone may be provided in a predetermined gradient range $(-\beta \leq \theta hi \leq +\beta)$ with a flat road defined as "θhi=0" in between. The dead zone range defined as $(-\beta \leq \theta hi \leq +\beta)$ may correspond to a range in which the own vehicle 1 does not start to move even when the braking force applied to the main brake 21a is released, i.e., may be set as a region that can be regarded as a flat location. It is to be noted that the first starting delay time Td1 may be calculated from an arithmetic expression on the basis of the estimated gradient θhi. In one implementation, the ACC_ECU 11 that performs the process in step S31 may serve as a "first delay time setter".

Figure 12:
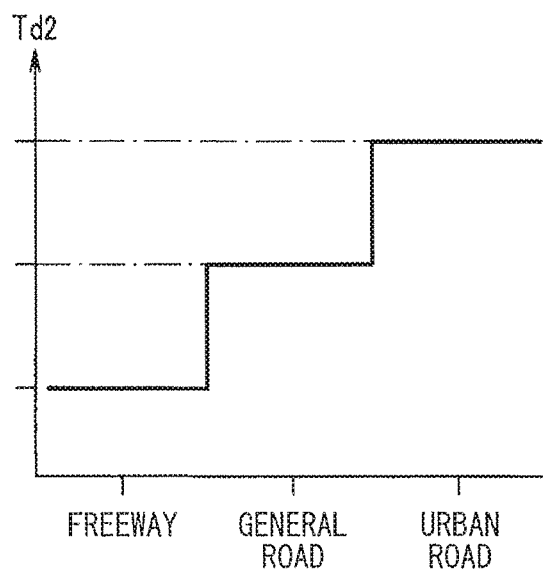
FIG. 12 is a conceptual diagram illustrating an example of a table directed to a second starting delay time.

The flow may thereafter proceed to step S32 in which a second starting delay time Td2 as a second delay time may be set on the basis of road type information. The second starting delay time Td2 may be set by referring to a table directed to the second starting delay time Td2 illustrated in FIG. 12.

The road type information may be obtained on the basis of the traveling environment information derived from the IPU 3, or map information derived from a navigation system. The traveling environment information may be directed to the traveling environment in the surroundings of the own vehicle 1, including the front of the own vehicle 1. In one implementation, the navigation system may serve as the "traveling environment information obtaining unit". In one implementation, the IPU 3, the navigation system, or both may serve as a "road type information obtaining unit". In the present implementation, the road type information may contain three categories including a freeway, a general road, and an urban road, which are categorized on the basis of a difference in factor ahead of the own vehicle 1. Non-limiting examples of the factor may include an interval between traffic lights and the number of pedestrians.

The freeway, the general road, and the urban road may be categorized in the table directed to the second starting delay time Td2, and may be set in ascending order of possibility that a pedestrian comes close to the stopped own vehicle 1, or in ascending order of possibility that the pedestrian crosses right in front of the own vehicle 1. For example, the second starting delay time Td2 may be set to zero (Td2=0) upon traveling on the freeway to allow the own vehicle 1 to restart with favorable responsiveness, in consideration of the freeway where it is unlikely that the pedestrian comes close to the own vehicle 1. In one implementation, the ACC_ECU 11 that performs the process in step S32 may serve as a "second delay time setter".

The flow may thereafter proceed to step S33 in which a third starting delay time Td3 as a third delay time may be set on the basis of the obstacle detection information. More specifically, in step S33, the obstacle detection information may be obtained on the basis of the images captured by the on-vehicle camera 2, following which a proximity level of an obstacle relative to the own vehicle 1 may be determined on the basis of the obstacle detection information to set the third starting delay time Td3. The obstacle detection information may relate to the obstacle located close to the own vehicle 1 or the obstacle that crosses right in front of the own vehicle 1. The non-limiting examples of the obstacle may include a pedestrian, a bicycle, and a motorcycle. The third starting delay time Td3 may be set to be longer as the proximity level becomes higher, in consideration of a fact that the obstacle comes into contact with the own vehicle 1 with higher possibility as its proximity level relative to the own vehicle 1 becomes higher.

Figure 13:
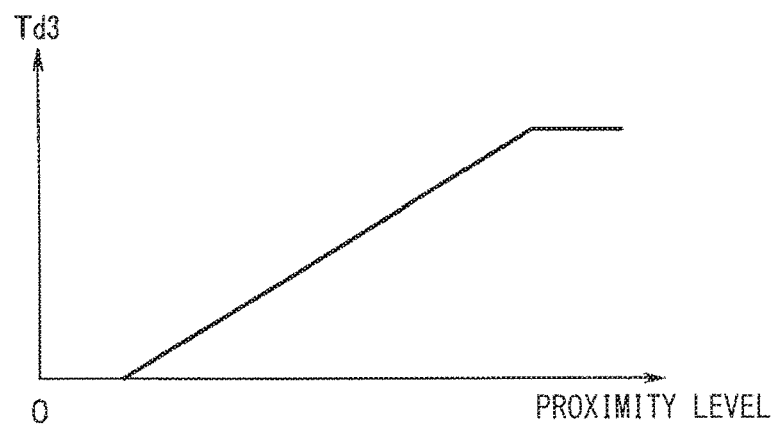
FIG. 13 is a conceptual diagram illustrating an example of a table directed to a third starting delay time.

The third starting delay time Td3 according to the present implementation may be set by referring to a table directed to the third starting delay time Td3 illustrated in FIG. 13. The table directed to the third starting delay time Td3 may be so configured that the third starting delay time Td3 is set to be longer as the proximity level becomes higher. The third starting delay time Td3 may be set to zero (Td3=0) when the obstacle is undetected, or when the obstacle is far away from the own vehicle 1. It is to be noted that the third starting delay time Td3 may be calculated from an arithmetic expression.

In one example where the own vehicle 1 is mounted with a detection sensor such as ultrasonic radar, LiDAR, and millimeter-wave radar, the obstacle detection information may be obtained on the basis of such a detection sensor. In this example, in consideration of such a detection sensor which is lower in obstacle recognition probability than the on-vehicle camera 2, reliability such as probability of presence of the obstacle may be first determined from the thus-obtained obstacle detection information, following which the third starting delay time Td3 may be determined on the basis of the obstacle detection information that involves the reliability of a predetermined value or more.

It is to be noted that, when the obstacle that comes close to the own vehicle 1 is detected, the following-automatic-start control can be deactivated to switch from the following-automatic-start control to the control based on the normal ACC that allows the own vehicle to start on the basis of the driver's intention. However, guardrails that come close to the own vehicle 1 relatively, or another vehicle that travels an adjacent lane and comes close to the own vehicle 1 relatively, may possibly be recognized as the obstacle erroneously when the own vehicle 1 performs the following stop. In this case, deactivating the following-automatic-start control to set the control based on the normal ACC may give the driver a feeling of strangeness. In contrast, setting the third starting delay time Td3 to be longer instead of deactivating the following-automatic-start control as with the present implementation reduces the feeling of strangeness, in that setting the third starting delay time Td3 to be longer allows the driver to adjust a timing of starting the own vehicle on his/her own will when the obstacle is erroneously recognized. In one implementation, the ACC_ECU 11 that performs the process in step S33 may serve as a "third delay time setter".

Figure 14:
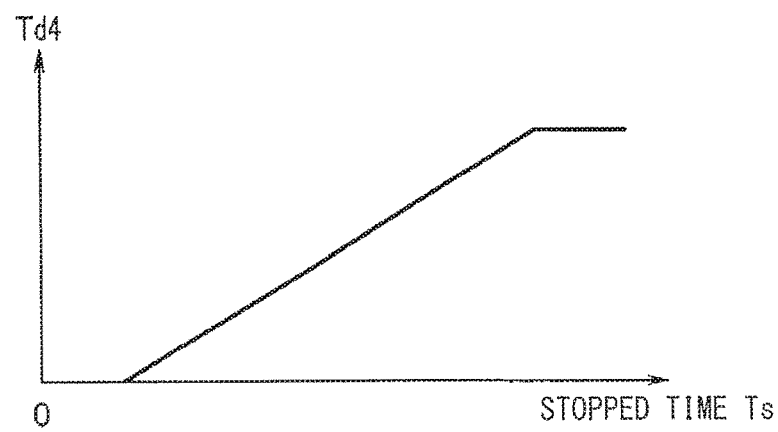
FIG. 14 is a conceptual diagram illustrating an example of a table directed to a fourth starting delay time.

The flow may thereafter proceed to step S34 in which a fourth starting delay time Td4 as a fourth delay time may be set on the basis of the stopped time Ts. The fourth starting delay time Td4 may be so set that a value thereof becomes larger as the stopped time Ts becomes longer, in consideration of the driver whose concentration decreases gradually as the stopped time Ts becomes longer. The fourth starting delay time Td4 may be set to zero (Td4=0) during a time period immediately after the stop of the own vehicle 1 in which the concentration of the driver is maintained. The fourth starting delay time Td4 according to the present implementation may be set by referring to a table directed to the fourth starting delay time Td4 illustrated in FIG. 14. The table directed to the fourth starting delay time Td4 may be so configured that the fourth starting delay time Td4 is set to be substantially in proportion to the stopped time Ts. It is to be noted that the fourth starting delay time Td4 may be calculated from an arithmetic expression. In one implementation, the ACC_ECU 11 that performs the process in step S34 may serve as a "fourth delay time setter".

The flow may thereafter proceed to step S35 in which a fifth starting delay time Td5 as a fifth delay time may be set on the basis of an acceleration rate of the preceding vehicle P at the time of the start of the preceding vehicle P, i.e., a preceding vehicle acceleration rate $\alpha s$. The inter-vehicular distance between the preceding vehicle P and the own vehicle 1 increases greatly when the preceding vehicle P starts at a relatively high acceleration rate, causing the driver to experience late starting or clumsiness if the long starting delay time is set for the own vehicle 1 in such a case. To address this, the fifth starting delay time Td5 may be so set as to be substantially in negative proportion to the preceding vehicle acceleration rate $\alpha s$.

Figure 15:
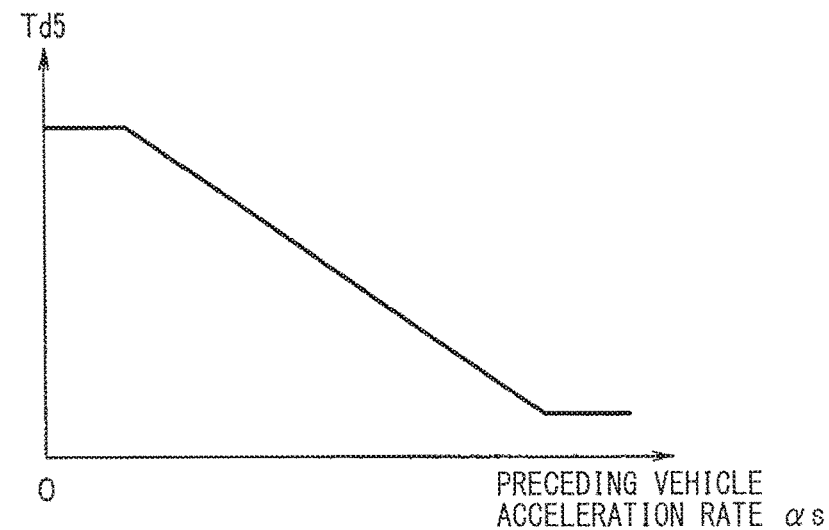
FIG. 15 is a conceptual diagram illustrating an example of a table directed to a fifth starting delay time.

The fifth starting delay time Td5 according to the present implementation may be set by referring to a table directed to the fifth starting delay time Td5 illustrated in FIG. 15. The table directed to the fifth starting delay time Td5 may be so configured that the fifth starting delay time Td5 is set to be substantially in negative proportion to the preceding vehicle acceleration rate $\alpha s$. It is to be noted that the fifth starting delay time Td5 in this case may be calculated from an arithmetic expression. The preceding vehicle acceleration rate $\alpha s$ may be determined on the basis of a relative travel distance per unit time of the preceding vehicle P calculated by the IPU 3 and the speed of the own vehicle 1 detected by the vehicle speed sensor 16. In one implementation, the IPU 3 and the vehicle speed sensor 16 may serve as a "preceding vehicle acceleration rate detector". In one implementation, the ACC_ECU 11 that performs the process in step S35 may serve as a "fifth delay time setter".

The flow may thereafter proceed to step S36 in which the first starting delay time Td1 to the fifth starting delay time Td5 determined respectively in the foregoing steps S31 to S35 may be compared with one another to set, as the starting delay time Td, the longest delay time among the first starting delay time Td1 to the fifth starting delay time Td5. In other words, maximum one of Td1, Td2, Td3, Td4, and Td5 may be set as Td. The flow may thereafter proceed to step S37 in which the start control may be performed on the basis of the thus-set starting delay time Td. The flow may proceed to step S24 in FIG. 8 after the execution of the start control based on the starting delay time Td. In one implementation, the ACC_ECU 11 that performs the process in step S36 may serve as a "delayed start controller".

The foregoing step S37 may involve subtraction of the ISS return time from the starting delay time Td to calculate the brake-releasing delay time. The ISS return time is set in advance for each vehicle model, and may range from t0 to t1 denoted in FIG. 3B. The brake-releasing delay time may range from t1 to t2 denoted in FIG. 3B. After the calculation of the brake-releasing delay time, the engine 5 having been subjected to the idling stop may be first restarted by means of the ISS to cause an unillustrated engine control unit to execute an idle speed control. Thereafter, the brake driver 12 may cause the main brake actuator 21 to release, after the elapse of the foregoing starting delay time Td (t2 denoted in FIG. 3B), the main brake 21a at a timing at which the own vehicle 1 starts to move at an idle speed (i.e., by means of creep torque).

For example, the starting delay time Td may be set on the basis of the first starting delay time Td1 (Td: Td1) when the second starting delay time Td2 to the fifth starting delay time Td5 determined respectively in the foregoing steps S32 to S35 are shorter than the first starting delay time Td1 set in step S31. The first starting delay time Td1 may be so set as to allow the own vehicle 1 to start to move at a timing substantially the same as a timing at which the own vehicle 1 starts to move on a flat location, without being influenced by the estimated gradient θhi of the road surface on which the own vehicle 1 is stopped. Hence, it is possible to overcome the clumsy movement that occurs until the own vehicle 1 starts to in a case of the upward slope, and to prevent the own vehicle 1 from starting to move at an early timing in a case of the downward slope.

Further, for example, it is possible to start the own vehicle 1 safely in accordance with a surrounding environment, when any starting delay time that is the longest among second starting delay time Td2 to the fifth starting delay time Td5 and that is longer than the first starting delay time Td1 is set as the starting delay time Td.

In one example where the own vehicle 1 has a driver monitor system (DMS) that may serve as, in one implementation, a face position monitoring unit that monitors a face position of the driver, a sixth starting delay time Td6 may be provided that serves as a sixth delay time and that is set on the basis of a detection result obtained by the DMS. The sixth starting delay time Td6 may be set to be shorter on the basis of the detection result obtained by the DMS when the driver faces to the front, and may be set to be longer on the basis of the detection result when the driver faces to the side. In this example, the longest delay time among the first starting delay time Td1 to the sixth starting delay time Td6 may be set as the starting delay time Td in step S36. In one implementation, the ACC_ECU 11 that performs this process may serve as a "sixth delay time setter".

Referring to FIG. 8, after the flow proceeds to step S24 from step S23, a start-acceleration suppressing time Tα may be set as a delay time that ranges from the elapsed time t2 to an elapsed time t3 denoted in FIG. 3B. The start-acceleration suppressing time Tα may be a time required to reach a predetermined vehicle speed after the start of the own vehicle 1. A transition may be made to the normal ACC after the elapse of the start-acceleration suppressing time Tα. The start-acceleration suppressing time Tα may be set using the idle speed (i.e., the creep torque) upon traveling on a flat location as a reference, allowing a higher acceleration rate to be set when the start-acceleration suppressing time Tα is set shorter than a time that corresponds to the reference, and allowing a lower acceleration rate to be set when the start-acceleration suppressing time Tα is set longer than the time that corresponds to the reference. It is to be noted that a delayed start time may be set on the basis of the starting delay time Td and the start-acceleration suppressing time Tα. The delayed start time defined as "Td+Tα" may serve as a start-acceleration time to be executed upon the delayed start mode.

Figure 10:
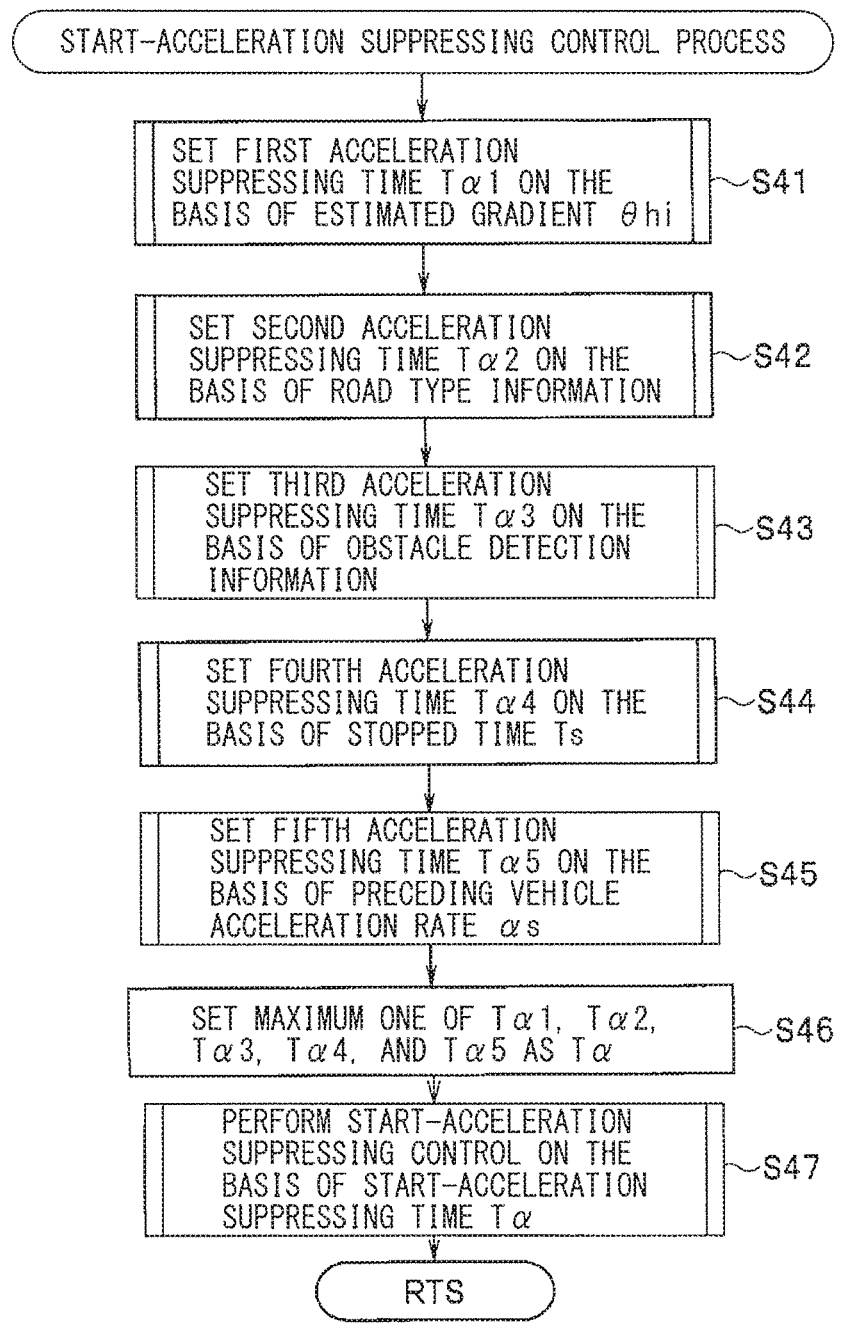
FIG. 10 is a flowchart illustrating an example of a subroutine of processes directed to a start-acceleration suppressing control.

A process of a start-acceleration suppressing control in step S24 may be performed in accordance with a subroutine of the start-acceleration suppressing control process illustrated by way of example in FIG. 10. In one implementation, the ACC_ECU 11 that performs the processes from steps S42 to S45 as described below may serve as the "at least one delay time setter".

Figure 16:
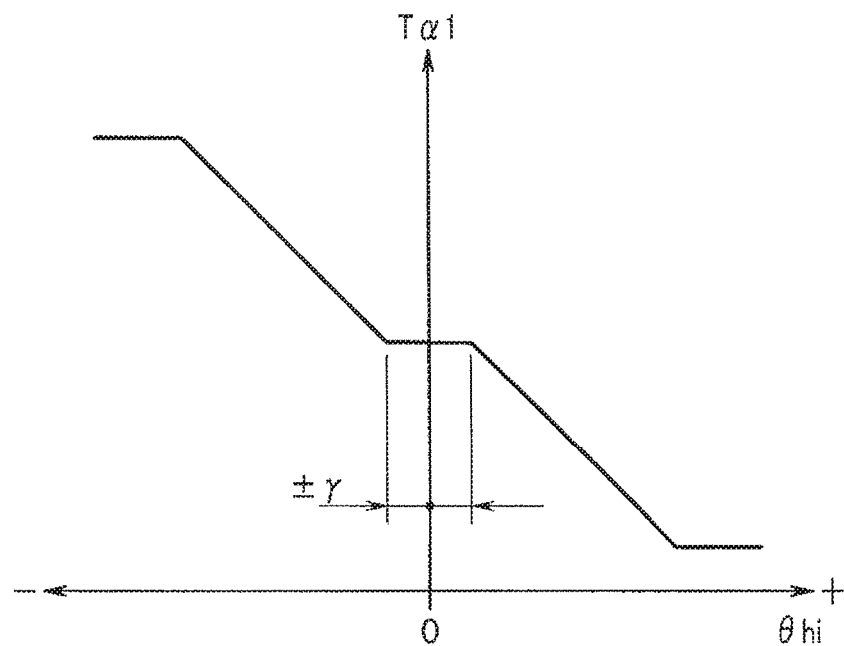
FIG. 16 is a conceptual diagram illustrating an example of a table directed to a first acceleration suppressing time.

The start-acceleration suppressing control process subroutine may first involve, in step S41, reading out of the estimated gradient θhi to thereby set, on the basis of the estimated gradient θhi, a first acceleration suppressing time Tα1 as the first delay time. The estimated gradient θhi may be the gradient of the road surface at the time of the stop of the own vehicle 1, and may be similar to the estimated gradient θhi used in the foregoing step S31. The first acceleration suppressing time Tα1 may be so set that an acceleration characteristic, substantially the same as that obtained when the own vehicle 1 travels on a flat location, is obtained without being influenced by the road surface gradient upon the start. The first acceleration suppressing time Tα1 according to the present implementation may be set on the basis of the estimated gradient θhi and by referring to a table directed to the first acceleration suppressing time Tα1 illustrated in FIG. 16.

When the own vehicle 1 is stopped on a slope, the slip-down force acts on the own vehicle 1 constantly. Accordingly, the own vehicle 1 tends to start suddenly in a case of the downward slope due to the addition of the slip-down force, whereas the own vehicle 1 tends to start in a delayed fashion in a case of the upward slope due to a fact that the own vehicle 1 starts to move when the start torque is obtained that is equal to or greater than the downward force that acts constantly on the own vehicle 1, where the torque applied to the own vehicle 1 that starts from the slope is the same between those cases. The able directed to the first acceleration suppressing time Tα1 illustrated in FIG. 16 may be so configured that the first acceleration suppressing time Tα1 is set by which the own vehicle 1 is able to so start as to follow the preceding vehicle P at a substantially constant acceleration rate when the own vehicle 1 starts from the slope, without being influenced by the gradient of the slope such as the downward slope and the upward slope.

For example, in order to allow the acceleration rate upon the start to be obtained that is substantially constant for both the downward slope and the upward slope, the table directed to the first acceleration suppressing time Tα1 may be so configured that the first acceleration suppressing time Tα1 is set, on the basis of the estimated gradient θhi, to be longer, i.e., the own vehicle 1 starts slowly at a lower acceleration rate, as the estimated gradient θhi goes more to a minus direction (i.e., as the downward gradient increases) in a case of the downward slope, and that the first acceleration suppressing time $T\alpha 1$ is set, on the basis of the estimated gradient $\theta hi$, to be gradually shorter, i.e., the own vehicle 1 starts fast at a higher acceleration rate, as the estimated gradient $\theta hi$ becomes greater in a case of the upward slope. Hence, it is possible to prevent the driver from experiencing the clumsiness in a case where the own vehicle 1 starts and accelerates from the upward slope, and to prevent the driver from experiencing a feeling of rushing forward in a case where the own vehicle 1 starts and accelerates from the downward slope.

The table directed to the first acceleration suppressing time $T\alpha 1$ may have a dead zone range ($-\gamma \leq \theta hi \leq +\gamma$) with the flat road defined as "$\theta hi=0$" in between. The dead zone range defined as ($-\gamma \leq \theta hi \leq +\gamma$) may correspond to a range in which the own vehicle 1 does not start to move even when the braking force applied to the main brake 21a is released, i.e., may be set as a region that can be regarded as a flat location. It is to be noted that the first acceleration suppressing time $T\alpha 1$ may be calculated from an arithmetic expression on the basis of the estimated gradient $\theta hi$. In one implementation, the ACC_ECU 11 that performs the process in step S41 may serve as the "first delay time setter".

Figure 17:
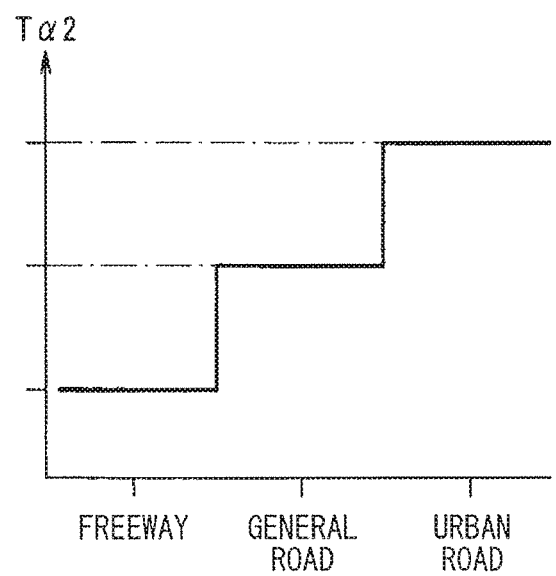
FIG. 17 is a conceptual diagram illustrating an example of a table directed to a second acceleration suppressing time.

The flow may thereafter proceed to step S42 in which a second acceleration suppressing time $T\alpha 2$ as the second delay time may be set on the basis of road type information that may be similar to the road type information used in the foregoing step S32. The second acceleration suppressing time $T\alpha 2$ may be set by referring to a table directed to the second acceleration suppressing time $T\alpha 2$ illustrated in FIG. 17. The freeway, the general road, and the urban road may be categorized in the table directed to the second acceleration suppressing time $T\alpha 2$, and may be set in ascending order of possibility that the pedestrian comes close to the stopped own vehicle 1, or in ascending order of possibility that the pedestrian crosses right in front of the own vehicle 1. For example, the second acceleration suppressing time $T\alpha 2$ may be set to zero ($T\alpha 2=0$) upon traveling on the freeway to allow for favorable acceleration performance upon the start, in consideration of the freeway where it is unlikely that the pedestrian comes close to the own vehicle 1. In one implementation, the ACC_ECU 11 that performs the process in s S42 may serve as the "second delay time setter".

The flow may thereafter proceed to step S43 in which a third acceleration suppressing time $T\alpha 3$ as the third delay time may be set on the basis of the obstacle detection information. More specifically, in step S43, the proximity level of the obstacle relative to the own vehicle 1 may be determined in a manner similar to that in the foregoing step S33 to set the third acceleration suppressing time $T\alpha 3$ on the basis of the proximity level. The third acceleration suppressing time $T\alpha 3$ may be set to be longer as the proximity level becomes higher, in consideration of a fact that the obstacle comes into contact with the own vehicle 1 with higher possibility as its proximity level relative to the own vehicle 1 becomes higher.

Figure 18:
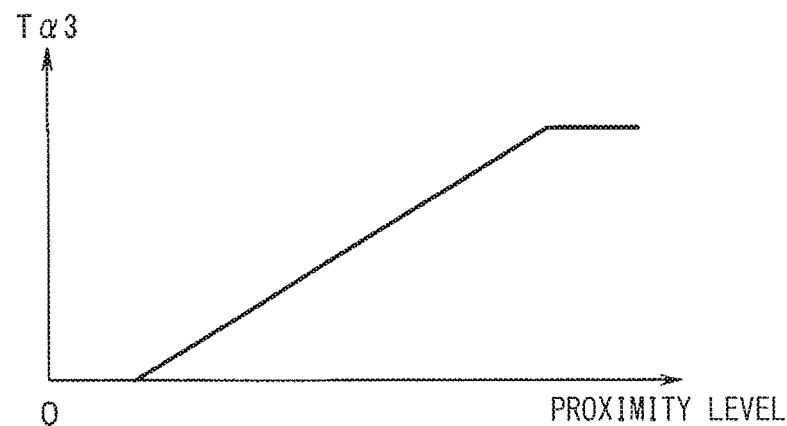
FIG. 18 is a conceptual diagram illustrating an example of a table directed to a third acceleration suppressing time.

The third acceleration suppressing time $T\alpha 3$ according to the present implementation may be set by referring to a table directed to the third acceleration suppressing time $T\alpha 3$ illustrated in FIG. 18. The table directed to the third acceleration suppressing time $T\alpha 3$ may be so configured that the third acceleration suppressing time $T\alpha 3$ is set to be longer as the proximity level becomes higher. The third acceleration suppressing time $T\alpha 3$ may be set to zero ($T\alpha 3=0$) when the obstacle is undetected, or when the obstacle is far away from the own vehicle 1. It is to be noted that the third acceleration suppressing time $T\alpha 3$ may be calculated from an arithmetic expression in this case. As described above, in one example where the own vehicle 1 is mounted with a detection sensor such as the ultrasonic radar, the LiDAR, and the millimeter-wave radar, the reliability such as the probability of presence of the obstacle may be determined from the obstacle detection information obtained on the basis of such a detection sensor, following which the third acceleration suppressing time $T\alpha 3$ may be determined on the basis of the obstacle detection information that involves the reliability of a predetermined value or more.

It is to be noted that, when the obstacle that comes close to the own vehicle 1 is detected upon the start of the own vehicle 1, the following-automatic-start control can be deactivated to switch from the following-automatic-start control to the control based on the normal ACC that allows the own vehicle 1 to start on the basis of the driver's intention. However, setting the third acceleration suppressing time $T\alpha 3$ to be longer instead of deactivating the following-automatic-start control reduces the feeling of strangeness, in that setting the third acceleration suppressing time $T\alpha 3$ to be longer allows the driver to perform, when the obstacle is erroneously recognized, an operation such as the braking operation on his/her own will even while the own vehicle 1 is accelerating. In one implementation, the ACC_ECU 11 that performs the process in step S43 may serve as the "third delay time setter".

The flow may thereafter proceed to step S44 in which a fourth acceleration suppressing time $T\alpha 4$ as the fourth delay time may be set on the basis of the stopped time Ts. The fourth acceleration suppressing time $T\alpha 4$ may be so set that a value thereof is substantially in proportion to the stopped time Ts, in consideration of the driver whose concentration decreases gradually as the stopped time Ts becomes longer as described above. Accordingly, the fourth acceleration suppressing time $T\alpha 4$ may be set to zero ($T\alpha 4=0$) during a time period immediately after the stop of the own vehicle 1 in which the concentration of the driver is maintained.

Figure 19:
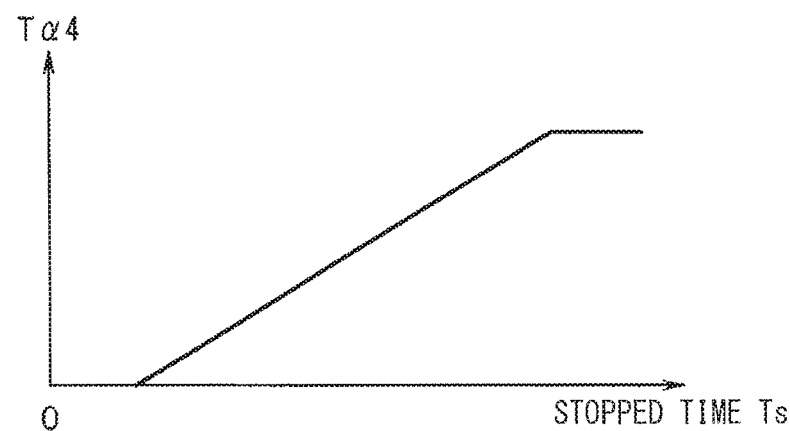
FIG. 19 is a conceptual diagram illustrating an example of a table directed to a fourth acceleration suppressing time.

The fourth acceleration suppressing time $T\alpha 4$ according to the present implementation may be set by referring to a table directed to the fourth acceleration suppressing time $T\alpha 4$ illustrated in FIG. 19. The table directed to the fourth acceleration suppressing time $T\alpha 4$ may be so configured that the fourth acceleration suppressing time $T\alpha 4$ is set to be substantially in proportion to the stopped time Ts. It is to be noted that the fourth acceleration suppressing time $T\alpha 4$ may be calculated from an arithmetic expression. In one implementation, the ACC_ECU 11 that performs the process in step S44 may serve as the "fourth delay time setter".

The flow may thereafter proceed to step S45 in which a fifth acceleration suppression time $T\alpha 5$ as the fifth delay time may be set on the basis of the preceding vehicle acceleration rate $\alpha s$. The inter-vehicular distance between the preceding vehicle P and the own vehicle 1 increases greatly when the preceding vehicle P starts at a relatively high acceleration rate, causing the driver to experience inadequate acceleration if the long start-acceleration suppressing time set for the own vehicle 1 in such a case. To address this, the fifth acceleration suppressing time $T\alpha 5$ may be so set as to be substantially in negative proportion to the preceding vehicle acceleration rate $\alpha s$.

Figure 20:
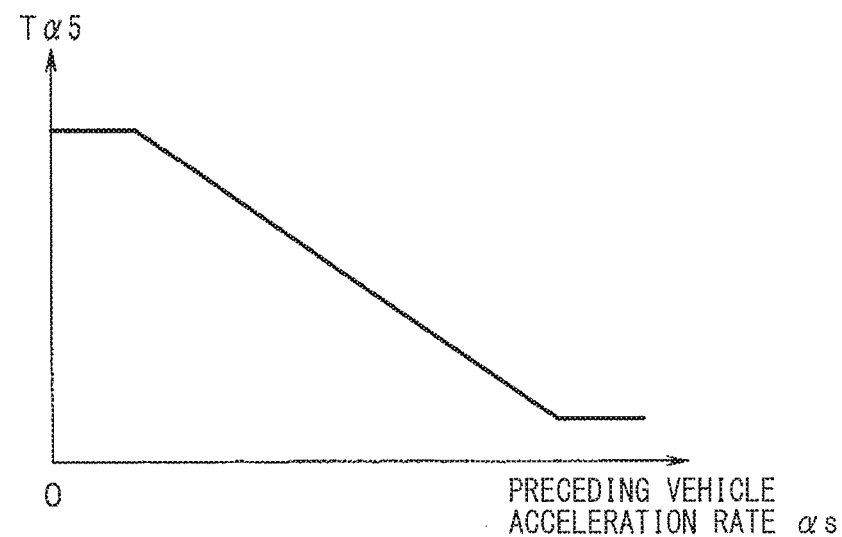
FIG. 20 is a conceptual diagram illustrating an example of a table directed to a fifth acceleration suppressing time.

The fifth acceleration suppressing time $T\alpha 5$ according to the present implementation may be set by referring to a table directed to the fifth acceleration suppressing time $T\alpha 5$ illustrated in FIG. 20. The table directed to the fifth acceleration suppressing time $T\alpha 5$ may be so configured that the fifth acceleration suppressing time $T\alpha 5$ is set to be substantially in negative proportion to the preceding vehicle acceleration rate αs. It is to be noted that the fifth acceleration suppressing time Tα5 in this case may be calculated from an arithmetic expression. In one implementation, the ACC_ECU 11 that performs the process in step S45 may serve as the "fifth delay time setter".

The flow may thereafter proceed to step S46 in which the first acceleration suppressing time Tα1 to the fifth acceleration suppressing time Tα5 determined respectively in the foregoing steps S41 to S45 may be compared with one another set, as the start-acceleration suppressing time Tα, the longest acceleration suppressing time among the first acceleration suppressing time Tα1 to the fifth acceleration suppressing Tα5. In other words, maximum one of Tα1, Tα2, Tα3, Tα4, and Tα5 may be set as Tα. The flow may thereafter proceed to step S47 in which the start control may be performed on the basis of the thus-set start-acceleration suppressing time Tα. The flow may proceed to step S17 in FIG. 7 after the execution of the start control based on the start-acceleration suppressing time Tα. In one implementation, the ACC_ECU 11 that performs the process in step S46 may serve as the "delayed start controller".

The start-acceleration suppressing control may be so performed in the foregoing step S47 that the own vehicle 1 travels at a set vehicle speed after the elapse of the start-acceleration suppressing time Tα, i.e., after the elapsed time t3, from the timing at which the own vehicle 1 has started to move, i.e., from the elapsed time t2. Accordingly, for example, the start-acceleration suppressing time Tα may be set on the basis of the first acceleration suppressing time Tα1 when the second acceleration suppressing time Tα2 to the fifth acceleration suppressing time Tα5 set respectively in steps S42 to S45 are shorter than the first acceleration suppressing time Tα1 set in step S41. Thus, it is possible to achieve constant acceleration upon the start regardless of whether a road is a flat road, a downward-sloped road, or an upward-sloped road. Hence, it is possible to prevent the driver from experiencing the clumsiness in a case where the own vehicle 1 starts and accelerates from the upward slope, and to prevent the driver from experiencing the feeling of rushing forward in a case where the own vehicle 1 starts and accelerates from the downward slope.

Further, for example, it is possible to accelerate the own vehicle 1 safely in accordance with a surrounding environment, when any acceleration suppressing time that is the longest among the second acceleration suppressing time Tα2 to the fifth acceleration suppressing time Tα5 and that is longer than the first acceleration suppressing time Tα1 is set as the start-acceleration suppressing time Tα.

In one example where the own vehicle 1 has the DMS, a sixth acceleration suppressing time Tα6 may be provided that serves as the sixth delay time and that is set on the basis of a detection result obtained by the DMS. The sixth acceleration suppressing time Tα6 may be set to be shorter on the basis of the detection result obtained by the DMS when the driver faces to the front, and may be set to be longer on the basis of the detection result when the driver faces to the side. In this example, the longest acceleration suppressing among the first acceleration suppressing time Tα1 to the sixth acceleration suppressing time Tα6 may be set as the start-acceleration suppressing time Tα in step S46. In one implementation, the ACC_ECU 11 that performs the process performed in this process may serve as the "sixth delay time setter".

After the flow proceeds to step S17 from step S14, step S15, or step S16 in FIG. 7, the following-automatic-start control may be deactivated. The routine may be terminated after the deactivation of the following-automatic-start control.

The ACC_ECU 11 may cause the transition to be made from the following-automatic-start control to the control based on the normal ACC when the following-automatic-start control is deactivated in the following-automatic-start control routine. Accordingly, the following-travel may be performed while keeping the inter-vehicular distance directed to the following travel between the own vehicle 1 and the preceding vehicle P when the flow proceeds to step S17 from step S15 or step S16. However, when the flow proceeds to step S17 from step S14, the standby mode may be set until an input of the operation that reflects the driver's intention of starting the own vehicle 1 is detected. Non-limiting examples of such an operation may include pressing down on the accelerator pedal and turning on the ACC switch.

According to the present implementation thus described, the timing and the acceleration rate both upon the start of the own vehicle 1 are set variably depending on the traveling environment in the surroundings of the own vehicle 1 including the front of the own vehicle 1, when the own vehicle 1 so starts automatically as to follow the preceding vehicle P. Hence, it is possible to start and accelerate the own vehicle 1 safely at a timing of starting the own vehicle 1 which the driver expects, and thereby to achieve favorable driving performance.

It is to be noted that the technique disclosed in JP-A No. 2015-214309 simply sets a timing of starting an own vehicle depending on a state of the start of a preceding vehicle. Meanwhile, for example, when a driver attempts to start the own vehicle on his/her own will by pressing down on an accelerator pedal, the driver starts the own vehicle while paying attention to a traveling environment and a surrounding environment both upon the start, besides the state of the start of the preceding vehicle. As an example of the traveling environment, the driver may pay attention as to whether a road is an upward sloped road or a downward sloped road. As an example of the surrounding environment, the driver may pay attention as to whether there is another vehicle that tries to cut in front of the own vehicle.

Under such circumstances, the following concerns may arise when the own vehicle so starts as to follow the preceding vehicle. For example, the own vehicle may cause a delay in starting when the own vehicle starts from the upward slope, and may rush forward due to a sudden acceleration when the own vehicle starts from the downward slope. These concerns bring about a discrepancy between a timing at which the own vehicle is actually started and a timing of starting the own vehicle which the driver expects. These in turn give the driver a sense of discomfort and make it difficult to achieve favorable driving performance.

In contrast, according to one implementation of the technology, the gradient of the road surface on which the own vehicle is stopped is estimated, and the first delay time (the first starting delay time Td1 and the first acceleration suppressing time Tα1) is set on the basis of the estimated road surface gradient, i.e., the estimated gradient. The first delay time is set to be longer for the downward slope as the estimated gradient becomes greater, and is set to be shorter for the upward slope as the estimated gradient becomes greater. Further, the delay time upon so starting the own vehicle as to follow the preceding vehicle is set on the basis of the first delay time. Thus, when causing the own vehicle to so start as to follow the preceding vehicle, it is possible to start the own vehicle at a timing of starting the own vehicle which the driver expects without being influenced by the road surface gradient. Hence, it is possible to reduce a possibility of giving the driver a sense of discomfort and thereby achieve favorable driving performance when causing the own vehicle to so start as to follow the preceding vehicle.

Although some preferred implementations of the technology have been described in the foregoing by way of example with reference to the accompanying drawings, the technology is by no means limited to the implementations described above. For example, the traveling environment information obtaining unit is not limited to the combination of the on-vehicle camera 2 and the IPU 3. Any device or any combination of devices may be employed as long as the device or the combination is able to detect the preceding vehicle P and obtain information on the preceding vehicle P, such as information on the inter-vehicular distance between the own vehicle 1 and the preceding vehicle P and information on the relative speed between the own vehicle 1 and the preceding vehicle P. Non-limiting examples of the device may include millimeter-wave radar, microwave radar, and infrared LiDAR. Any of such devices may be combined with the on-vehicle camera 2 or a monocular camera. In this case, information obtained by the device or the combination serves as the information on the traveling environment around the own vehicle 1.

The ACC_ECU 11 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the ACC_ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ACC_ECU 11 illustrated in FIGS. 1 and 2.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A following-start control apparatus comprising:
    a traveling environment information obtaining unit that obtains, as traveling environment information, information on a traveling environment around an own vehicle;
    a preceding vehicle information obtaining unit that obtains, as preceding vehicle information, information on a preceding vehicle that travels ahead of the own vehicle based on the traveling environment information obtained by the traveling environment information obtaining unit;
    a preceding vehicle start detector that determines, based on the preceding vehicle information obtained by the preceding vehicle information obtaining unit, an inter-vehicular distance between the preceding vehicle and the own vehicle that is stopped, and detects start of the preceding vehicle based on a change in the inter-vehicular distance; and
    a following-start controller that causes the own vehicle that is stopped to automatically start moving as to follow the preceding vehicle, when the start of the preceding vehicle is detected by the preceding vehicle start detector, the following-start controller including:
        a road surface gradient information setter that sets an estimated gradient of a road surface on which the own vehicle is stopped based on the traveling environment information obtained by the traveling environment information obtaining unit;
        a first delay time setter that sets a first delay time based on the estimated gradient set by the road surface gradient information setter, the first delay time being set to be longer as the estimated gradient becomes greater when the own vehicle is on a downward slope, and being set to be shorter as the estimated gradient becomes greater when the own vehicle is on an upward slope; and
        a delayed start controller that sets, as a delay time, a time upon so starting the own vehicle as to follow the preceding vehicle based on the first delay time set by the first delay time setter.

2. The following-start control apparatus according to claim 1, wherein
    the following-start controller further includes at least one delay time setter that sets, as at least one delay time, a time upon so starting the own vehicle as to follow the preceding vehicle based on one or more of the traveling environment information obtained by the traveling environment information obtaining unit, the preceding vehicle information obtained by the preceding vehicle information obtaining unit, and a stopped time of the own vehicle, the stopped time being a time period ranging from a time point at which the own vehicle is so stopped as to follow the preceding vehicle to a time point at which a command to start the own vehicle is outputted after the start of the preceding vehicle is detected, and
    the delayed start controller sets, as the delay time, longest one of the first delay time set by the first delay time setter and the at least one delay time set by the at least one delay time setter.

3. The following-start control apparatus according to claim 2, wherein
    the following-start controller further includes a road type information obtaining unit that obtains, as road type information, information on a type of a road on which the own vehicle travels based on the traveling environment information obtained by the traveling environment information obtaining unit, and
    the at least one delay time setter includes a second delay time setter that variably sets a second delay time based on the road type information obtained by the road type information obtaining unit.

4. The following-start control apparatus according to claim 2, wherein
    the following-start controller further includes an obstacle detection information obtaining unit that obtains, as obstacle detection information, information on an obstacle detected around the own vehicle based on the traveling environment information obtained by the traveling environment information obtaining unit, and the at least one delay time setter includes a third delay time setter that sets based on the obstacle detection information obtained by the obstacle detection information obtaining unit, a third delay time that is set to be longer as a proximity level of the detected obstacle relative to the own vehicle becomes higher.

5. The following-start control apparatus according to claim 3, wherein
the following-start controller further includes an obstacle detection information obtaining unit that obtains, as obstacle detection information, information on an obstacle detected around the own vehicle based on the traveling environment information obtained by the traveling environment information obtaining unit, and
the at least one delay time setter includes a third delay time setter that sets based on the obstacle detection information obtained by the obstacle detection information obtaining unit, a third delay time that is set to be longer as a proximity level of the detected obstacle relative to the own vehicle becomes higher.

6. The following-start control apparatus according to claim 2, wherein
the following-start controller further includes a stopped time measurer that measures the stopped time, and
the at least one delay time setter includes a fourth delay time setter that sets based on the stopped time measured by the stopped time measurer, a fourth delay time that is set to be longer as the stopped time becomes longer.

7. The following-start control apparatus according to claim 3, wherein
the following-start controller further includes a stopped time measurer that measures the stopped time, and
the at least one delay time setter includes a fourth delay time setter that sets based on the stopped time measured by the stopped time measurer, a fourth delay time that is set to be longer as the stopped time becomes longer.

8. The following-start control apparatus according to claim 2, wherein
the following-start controller further includes a preceding vehicle acceleration rate detector that detects an acceleration rate of the preceding vehicle which is at a time of the start of the preceding vehicle based on the preceding vehicle information obtained by the preceding vehicle information obtaining unit, and
the at least one delay time setter includes a fifth delay time setter that sets based on the acceleration rate of the preceding vehicle detected by the preceding vehicle acceleration rate detector, a fifth delay time that is set to be shorter as the acceleration rate becomes higher.

9. The following-start control apparatus according to claim 3, wherein
the following-start controller further includes a preceding vehicle acceleration rate detector that detects an acceleration rate of the preceding vehicle which is at a time of the start of the preceding vehicle based on the preceding vehicle information obtained by the preceding vehicle information obtaining unit, and
the at least one delay time setter includes a fifth delay time setter that sets based on the acceleration rate of the preceding vehicle detected by the preceding vehicle acceleration rate detector, a fifth delay time that is set to be shorter as the acceleration rate becomes higher.

10. The following-start control apparatus claim 2, wherein the following-start controller further includes:
a face position monitoring unit that monitors a face position of a driver; and
a sixth delay time setter that sets based on the face position of the driver detected by the face position monitoring unit, a sixth delay time that is set to be shorter when the driver faces to front and set to be longer when the driver faces to side, and
wherein the delayed start controller sets, as the delay time, longest one of the first delay time, the at least one delay time, and also the sixth delay time set by the sixth delay time setter.

11. The following-start control apparatus claim 3, wherein the following-start controller further includes:
a face position monitoring unit that monitors a face position of a driver; and
a sixth delay time setter that sets based on the face position of the driver detected by the face position monitoring unit, a sixth delay time that is set to be shorter when the driver faces to front and set to be longer when the driver faces to side, and
wherein the delayed start controller sets, as the delay time, longest one of the first delay time, the at least one delay time, and also the sixth delay time set by the sixth delay time setter.

12. The following-start control apparatus according to claim 2, wherein
a start-acceleration time upon so starting the own vehicle as to follow the preceding vehicle is configured by a starting delay time and a start-acceleration suppressing time, the starting delay time being a time period ranging from a time point at which the own vehicle is stopped to a time point at which the own vehicle is started to move, the start-acceleration suppressing time being a time period ranging from the time point at which the own vehicle is started to move to a time point at which the own vehicle travels at a set vehicle speed, and
the delay time set by the delayed start controller is set to the starting delay time.

13. The following-start control apparatus according to claim 3, wherein
a start-acceleration time upon so starting the own vehicle as to follow the preceding vehicle is configured by a starting delay time and a start-acceleration suppressing time, the starting delay time being a time period ranging from a time point at which the own vehicle is stopped to a time point at which the own vehicle is started to move, the start-acceleration suppressing time being a time period ranging from the time point at which the own vehicle is started to move to a time point at which the own vehicle travels at a set vehicle speed, and
the delay time set by the delayed start controller is set to the starting delay time.

14. The following-start control apparatus according to claim 2, wherein
a start-acceleration time upon so starting the own vehicle as to follow the preceding vehicle is configured by a starting delay time and a start-acceleration suppressing time, the starting delay time being a time period ranging from a time point at which the own vehicle is stopped to a time point at which the own vehicle is started to move, the start-acceleration suppressing time being a time period ranging from the time point at which the own vehicle is started to move to a time point at which the own vehicle travels at a set vehicle speed, and
the delay time set by the delayed start controller is set to the start-acceleration suppressing time.

15. The following-start control apparatus according to claim 3, wherein a start-acceleration time upon so starting the own vehicle as to follow the preceding vehicle is configured by a starting delay time and a start-acceleration suppressing time, the starting delay time being a time period ranging from a time point at which the own vehicle is stopped to a time point at which the own vehicle is started to move, the start-acceleration suppressing time being a time period ranging from the time point at which the own vehicle is started to move to a time point at which the own vehicle travels at a set vehicle speed, and the delay time set by the delayed start controller is set to the start-acceleration suppressing time.

16. A following-start control apparatus comprising:

a camera that captures an image of a traveling environment around an own vehicle to obtain image information; and circuitry that obtains, as traveling environment information, information on the traveling environment around the own vehicle based on the image information obtained by the camera, obtains, as preceding vehicle information, information on a preceding vehicle that travels ahead of the own vehicle based on the traveling environment information, and determines based on the preceding vehicle information, an inter-vehicular distance between the preceding vehicle and the own vehicle that is stopped, to detect start of the preceding vehicle based on a change in the inter-vehicular distance, wherein, when the start of the preceding vehicle is detected, the circuitry sets an estimated gradient of a road surface on which the own vehicle is stopped based on the traveling environment information, sets a first delay time based on the estimated gradient, the first delay time being set to be longer as the estimated gradient becomes greater when the own vehicle is on a downward slope, and being set to be shorter as the estimated gradient becomes greater when the own vehicle is on an upward slope, sets, as a delay time, a time upon so starting the own vehicle as to follow the preceding vehicle based on the first delay time, and causes the own vehicle that is stopped to automatically start moving as to follow the preceding vehicle based on the delay time.

* * * * *